US008408272B2

(12) United States Patent
Lawson et al.

(10) Patent No.: US 8,408,272 B2
(45) Date of Patent: *Apr. 2, 2013

(54) SYSTEM AND METHOD FOR MOUNTING A TIRE AND A WHEEL

(75) Inventors: Lawrence J. Lawson, Troy, MI (US);
Robert Reece, Clarkston, MI (US);
Joshua James Hicks, Clarkston, MI (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,388

(22) Filed: May 11, 2012

(65) Prior Publication Data

US 2012/0216962 A1    Aug. 30, 2012

Related U.S. Application Data

(63) Continuation of application No. 12/649,756, filed on Dec. 30, 2009, now Pat. No. 8,191,600.

(60) Provisional application No. 61/141,989, filed on Dec. 31, 2008.

(51) Int. Cl.
*B60C 25/0515* (2006.01)

(52) U.S. Cl. ........................................ 157/1.1; 157/1.22

(58) Field of Classification Search ............... 157/1.1, 157/1.22, 1.24; 29/894.31; 901/30.31
See application file for complete search history.

(56) References Cited

U.S. PATENT DOCUMENTS

| | | | | |
|---|---|---|---|---|
| 2,817,394 A | * | 12/1957 | Kriebel, Jr. et al. | 157/1.24 |
| 3,791,434 A | | 2/1974 | Duquesne et al. | |
| 4,420,026 A | * | 12/1983 | Goiseau | 157/1.24 |
| 4,621,671 A | * | 11/1986 | Kane et al. | 157/1.1 |
| 4,986,328 A | | 1/1991 | Metzger et al. | |
| 5,094,284 A | | 3/1992 | Curcuri | |
| 6,877,544 B2 | * | 4/2005 | Kane et al. | 157/1.24 |
| 7,264,032 B2 | | 9/2007 | Peinelt et al. | |
| 7,296,351 B2 | * | 11/2007 | Gonzaga | 29/894.31 |
| 7,481,258 B2 | * | 1/2009 | Vignoli | 157/1.24 |
| 7,543,622 B1 | * | 6/2009 | Carpenter et al. | 157/1.17 |
| 7,621,311 B2 | * | 11/2009 | Lawson et al. | 157/1.24 |
| 7,699,087 B2 | * | 4/2010 | Rogalla et al. | 157/1.1 |
| 8,191,600 B2 | * | 6/2012 | Lawson et al. | 157/1.1 |
| 2007/0000616 A1 | | 1/2007 | Rogalla et al. | |
| 2007/0074824 A1 | * | 4/2007 | Lawson et al. | 157/1.24 |

(Continued)

FOREIGN PATENT DOCUMENTS

DE    2535734 A1    2/1977
DE    3614738 A1    11/1987

(Continued)

OTHER PUBLICATIONS

Supplementary European Search Report for application EP 09 83 7190 dated May 9, 2012.
Notification of Reasons for Refusal for JP Application 2007-333293 dated Jun. 22, 2010 (Japanese Language and English Language).

(Continued)

*Primary Examiner* — David B Thomas
(74) *Attorney, Agent, or Firm* — Honigman Miller Schwartz and Cohn LLP

(57) ABSTRACT

A system for mounting a tire and a wheel is disclosed. The system includes a robotic arm pivotably-connected to an end effector. The system also includes a tire-supporting portion including a support surface and a pair of wheel-engaging and tire-manipulating portions disposed upon the support surface. The pair of wheel-engaging and tire-manipulating portions includes a first wheel-engaging and tire-manipulating portion fixedly-disposed relative the support surface and a second wheel-engaging and tire-manipulating portion movably-disposed relative the support surface.

19 Claims, 32 Drawing Sheets

U.S. PATENT DOCUMENTS

| | | | |
|---|---|---|---|
| 2008/0060768 A1* | 3/2008 | Vignoli | 157/1.24 |
| 2008/0156447 A1 | 7/2008 | Lawson et al. | |
| 2008/0289772 A1* | 11/2008 | Reeves, Jr. | 157/1.1 |
| 2009/0084506 A1* | 4/2009 | Lawson et al. | 157/1.1 |
| 2009/0236048 A1* | 9/2009 | Mimura | 157/1.24 |

FOREIGN PATENT DOCUMENTS

| | | |
|---|---|---|
| DE | 102005001212 A | 7/2006 |
| EP | 1738937 A2 | 1/2007 |
| EP | 1942019 A1 | 7/2008 |
| FR | 2804908 | 8/2001 |
| JP | 07-004105 A | 1/1995 |
| JP | 2005212585 A | 8/2005 |
| WO | WO-9942309 A1 | 8/1999 |

OTHER PUBLICATIONS

Office Action from Canadian Patent Office for Application 2616275 dated Nov. 8, 2010.
Office Action dated Jun. 9, 2010 for U.S. Appl. No. 11/957,068.
Office Action dated Dec. 3, 2010 for U.S. Appl. No. 11/957,068.
PCT Search Report for Application PCT/US2009/069893 dated Aug. 16, 2010.
Canadian Office Action dated Oct. 6, 2011 for Canadian Application Serial No. 2,616,275.
India Office Action dated Jun. 27, 2011 for Indian Application Serial No. 3138/CHE/2007.
Office Action from Mexican Patent Office for Application MX/a/2007/016446 dated Feb. 18, 2011 (including English translation).

* cited by examiner

SYSTEM AND METHOD FOR MOUNTING A TIRE AND A WHEEL

CROSS-REFERENCE TO RELATED APPLICATIONS

This application is a Continuation Application of U.S. patent application Ser. No. 12/649,756 (now U.S. Pat. No. 8,191,600) filed on Dec. 30, 2009. U.S. Pat. No. 8,191,600 claims the benefit of U.S. Provisional Application 61/141,989 filed on Dec. 31, 2008. The disclosures of these prior applications are considered part of the disclosure of this application and are hereby incorporated by reference in their entirety.

FIELD OF THE INVENTION

The disclosure relates to tire and wheel assemblies and to a system and method for mounting a tire and a wheel.

DESCRIPTION OF THE RELATED ART

Automated equipment for mounting vehicle tires and vehicle wheels is commonly available. Some of this equipment is designed to be used, for example, in an automobile repair shop setting where, for example, low volume tire-wheel de/mounting equipment is "fully automated" such that tires and wheels are continually fed to an apparatus that mounts tires and wheels.

Although the above method and other conventional methods for mounting a vehicle tire and a vehicle wheel are effective, these methods involve a significant capital investment for both the purchase and the maintenance of the equipment. The present invention overcomes drawbacks associated with the prior art by setting forth a simple method for mounting a vehicle tire and a vehicle wheel such that a minimal amount of equipment is utilized.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of a system and method for mounting a tire and a wheel in accordance with an embodiment of the invention. Based on the foregoing, it is to be generally understood that the nomenclature used herein is simply for convenience and the terms used to describe the invention should be given the broadest meaning by one of ordinary skill in the art.

Referring to FIGS. 1A-3, a system for mounting a tire, T, and a wheel, W, is shown generally at 10 according to an embodiment. Although the system 10 is explained from the context of holding the tire fixed (relative to the wheel) and manipulating the wheel to mount the wheel to the tires. It is to be understood that system 10 may also be used holding a wheel fixed (relative to the tire) and manipulating the tire to mount the tire to the wheel. In either mounting procedure, the system 10 may yield a fully or partially mounted tire-wheel assembly, TW (see, e.g., FIGS. 1C, 3, 4D, 6, 8).

It is important to note that the present invention eliminates the use of traditional installation tools (sometimes referred to as fitting tools, pressure roller wheels, tool packs or the like) used in the mounting of the tire to the wheel. It is accurate to characterize this aspect of the present invention as a "toolless" mounting system. In an embodiment, the present invention could also be understood as a mounting system wherein the wheel and the tire are manipulated in a way such that they function as the mounting tools (or at least as part of the mounting tools). In an embodiment, one of the tire or the wheel is driven by a prime mover, while the other remains passive. No other prime mover is used to introduce energy into the system to mount the wheel to the tire. This approach is vastly different from traditional methods all of which include the use of tools (such as tool packs and the like) to mount the tire to the wheel.

Figure 1A:
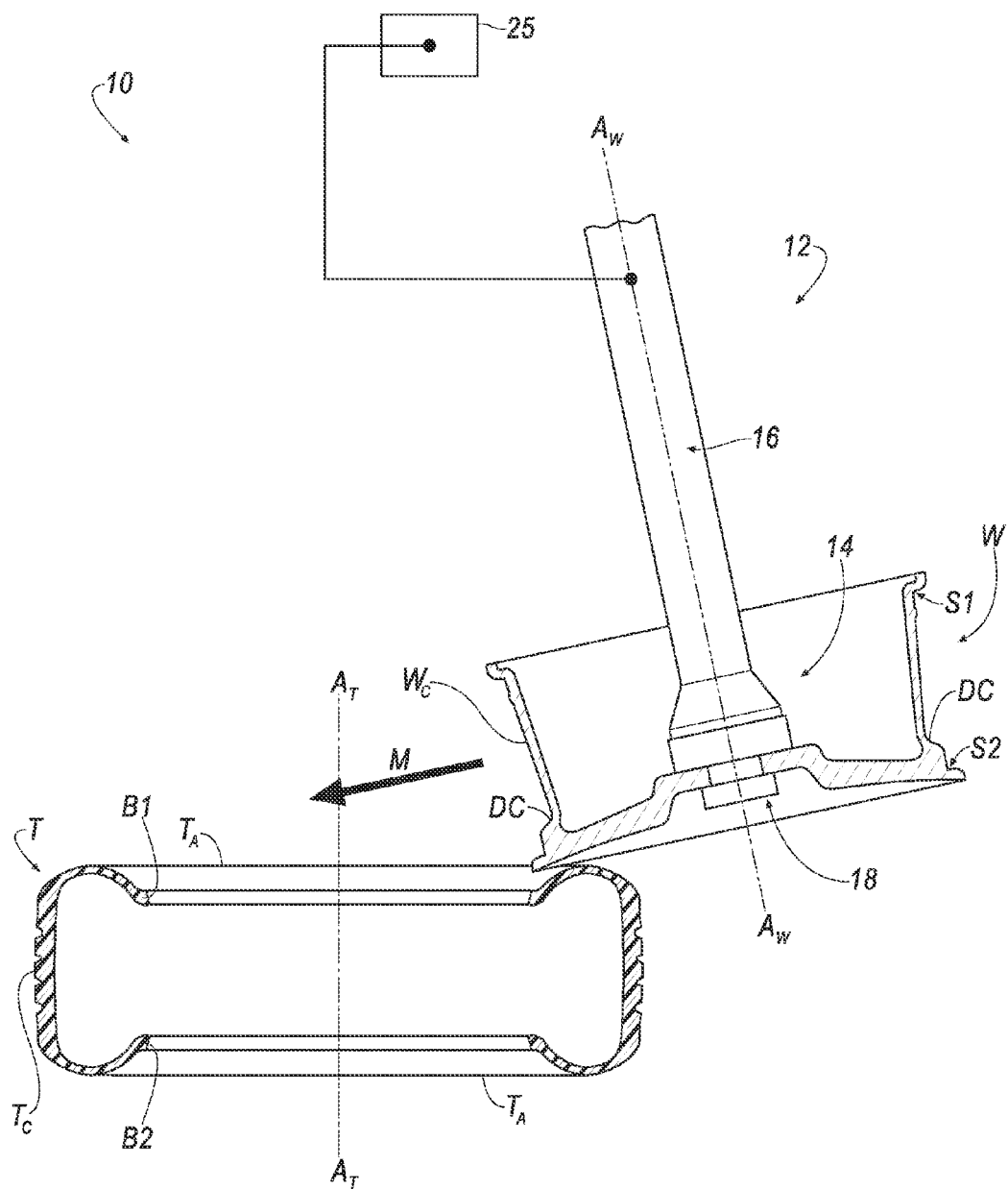
FIGS. 1A-1C show an apparatus and method for mounting a vehicle tire and a vehicle wheel in accordance with a first exemplary embodiment of the invention.
Figure 1B:
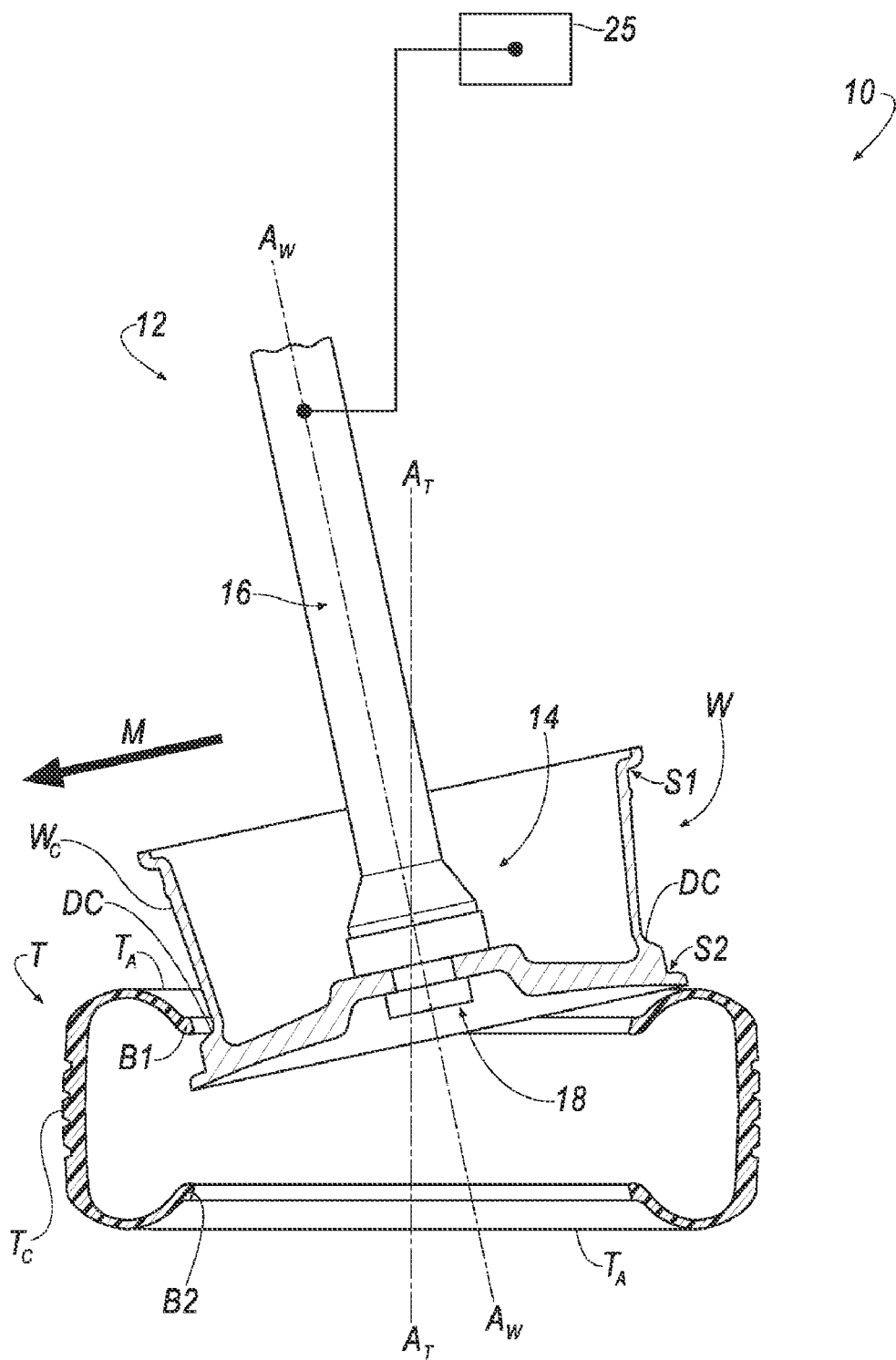
Figure 1C:
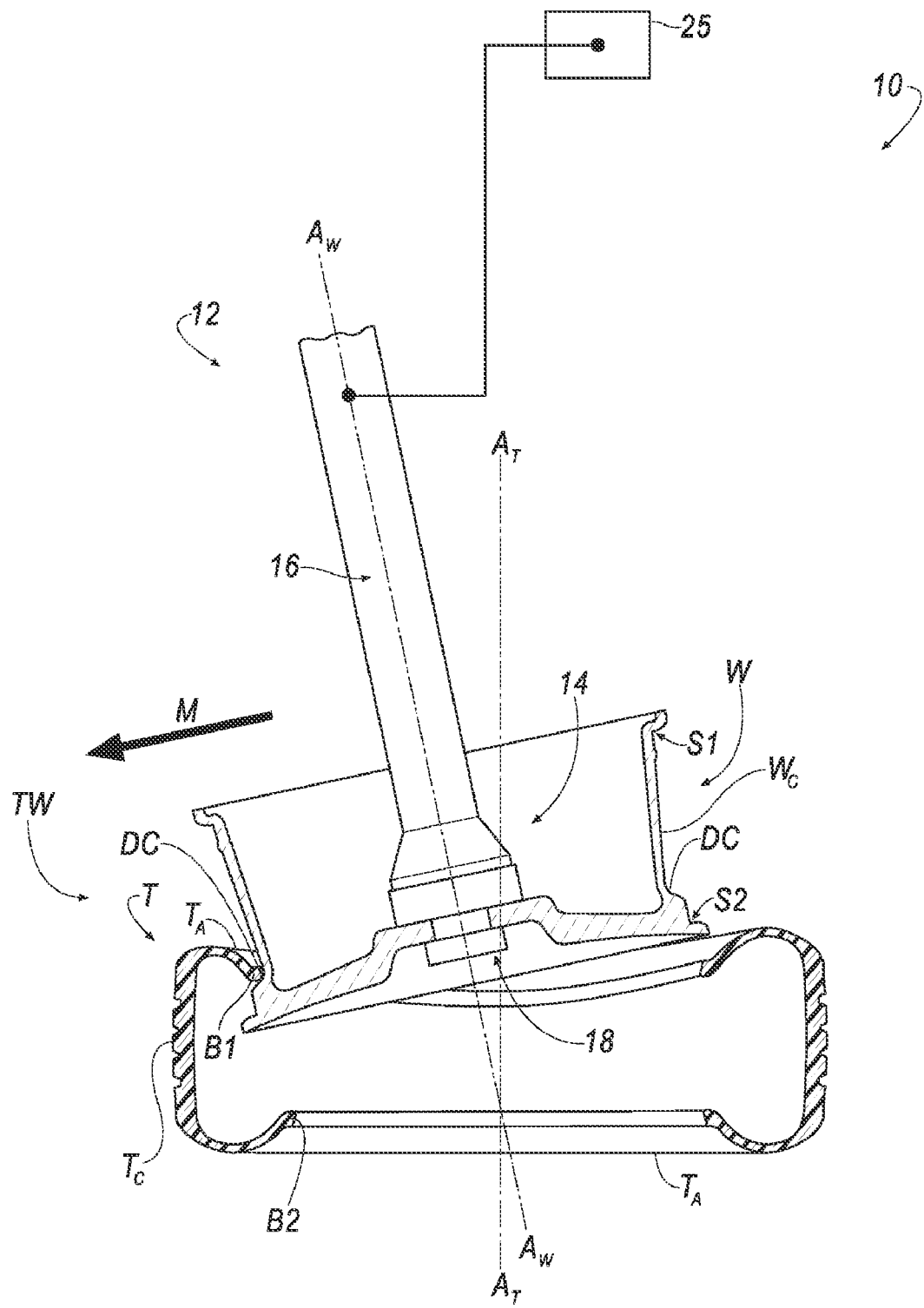
Figure 3:
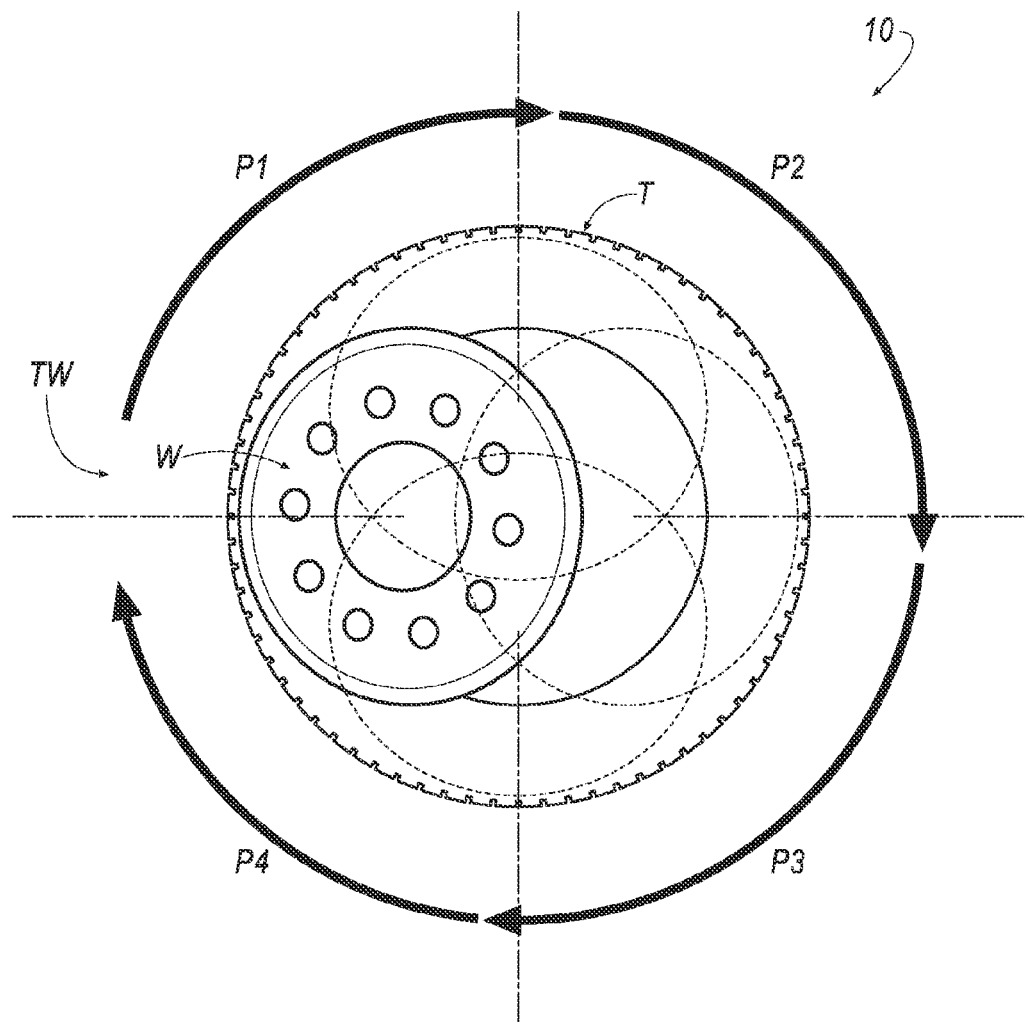
FIG. 3 illustrates a top view of the series of steps for mounting a vehicle tire and a vehicle wheel according to FIGS. 2A-2D.

In an embodiment, a "partial" mounting of a tire, T, and a wheel, W, may include one of the beads, B1, B2, of the tire, T, being partially or fully disposed about the circumference, $W_C$, of the wheel, W (see, e.g., FIGS. 1C and 3). In an embodiment, a "full" mounting of a tire, T, and a wheel, W, may include one of the beads, B1, B2, of the tire, T, being fully disposed about the circumference, $W_C$, of the wheel, W (see, e.g. FIGS. 4D and 6). In an embodiment, a "full" mounting of a tire, T, and a wheel, W, may also include both of the beads B1, B2, of the tire, T, being fully disposed about the circumference, $W_C$, of the wheel, W (see, e.g., FIG. 8). Accordingly, it will be appreciated that the mounting of a tire, T, and a wheel, W, may include the partial or full locating of one or more beads, B1, B2 about the circumference, $W_C$, of the tire, T, and that the tire, T, and wheel, W, may be mounted in any desirable fashion for additional processing in a subsequent station (not shown) that may include, for example, the match-marking, inflating, bead seating, uniformity testing, and balancing of the mounted tire-wheel assembly, TW.

Referring initially to FIG. 1A, the system 10 generally includes a wheel support arm assembly 12 including a rotating actuator 14, which is coupled between a base 16 and a spindle 18. The spindle 18 is coupled to the wheel W, for example, to the central hub portion of the wheel, W.

As illustrated, the tire, T, includes a first bead, B1, and a second bead, B2. An axis, $A_T$-$A_T$, extends through a center point or axis of rotation of the tire, T. The axis, $A_T$-$A_T$, is hereinafter referred to as a tire axis.

As illustrated, the wheel, W, includes a first bead seat, S1, that is adapted to receive and seat the first bead, B1, and a second bead seat, S2, that is adapted to receive and seat the second bead, B2. It will be appreciated that the circumference, $W_C$, of the wheel, W, includes the first and second bead seats, S1, S2.

An axis, $A_W$-$A_W$, may extend through a center point or axis of rotation of the wheel, W. The axis, $A_W$-$A_W$, is hereinafter referred to as a wheel axis.

The base 16 may be coupled to an actuator, which is shown generally at 25, that is capable of moving the entire wheel support arm assembly 12, and, accordingly, the wheel, W, in three-dimensional space. As illustrated, the wheel axis, $A_W$-$A_W$, extends through the wheel support arm assembly 12, and accordingly, movement of the wheel support arm assembly 12 by way of the actuator 25 also results in the movement of the wheel axis, $A_W$-$A_W$.

In an embodiment, the actuator 25 is capable of moving the wheel support arm assembly 12, in any number of directions such as a generally linear motion, M (see, e.g., FIGS. 1A-1C), in an embodiment, in a precessional motion, P1-P4 (see, e.g., FIGS. 2A-3), or, in an embodiment, in a plunging motion, P (see, e.g. FIGS. 4A-5D), or, in an embodiment, a non-precessional, rotational motion (see, e.g., FIGS. 7A-7E). The actuator 25 may be an automated device (such as a robot) that is governed by a processor (not shown), or, alternatively, a manually-operated device that is overseen and physically operated by a person (not shown).

In an embodiment, as shown in FIGS. 1A-1C, the support arm assembly 12 is swung, dropped or otherwise moved according to the direction of the arrow, M. Motion M may be any motion, or combination of motions (including a linear motion or a pendulum motion). As seen in FIG. 1A, the assembly 12 moves the wheel, W, proximate the tire, T. Then, in FIG. 1B, the assembly 12 moves a drop center portion, DC, of the wheel, W, proximate the first bead, B1, of the tire, T. Referring to FIGS. 1C/2A, the assembly 12 moves the drop center portion, DC, of the wheel, W, adjacent the first bead, B1, of the tire, T, such that a portion of the first bead, B1, of the tire, T, is pressed firmly against a portion of the drop center of the wheel, W.

Figure 2A:
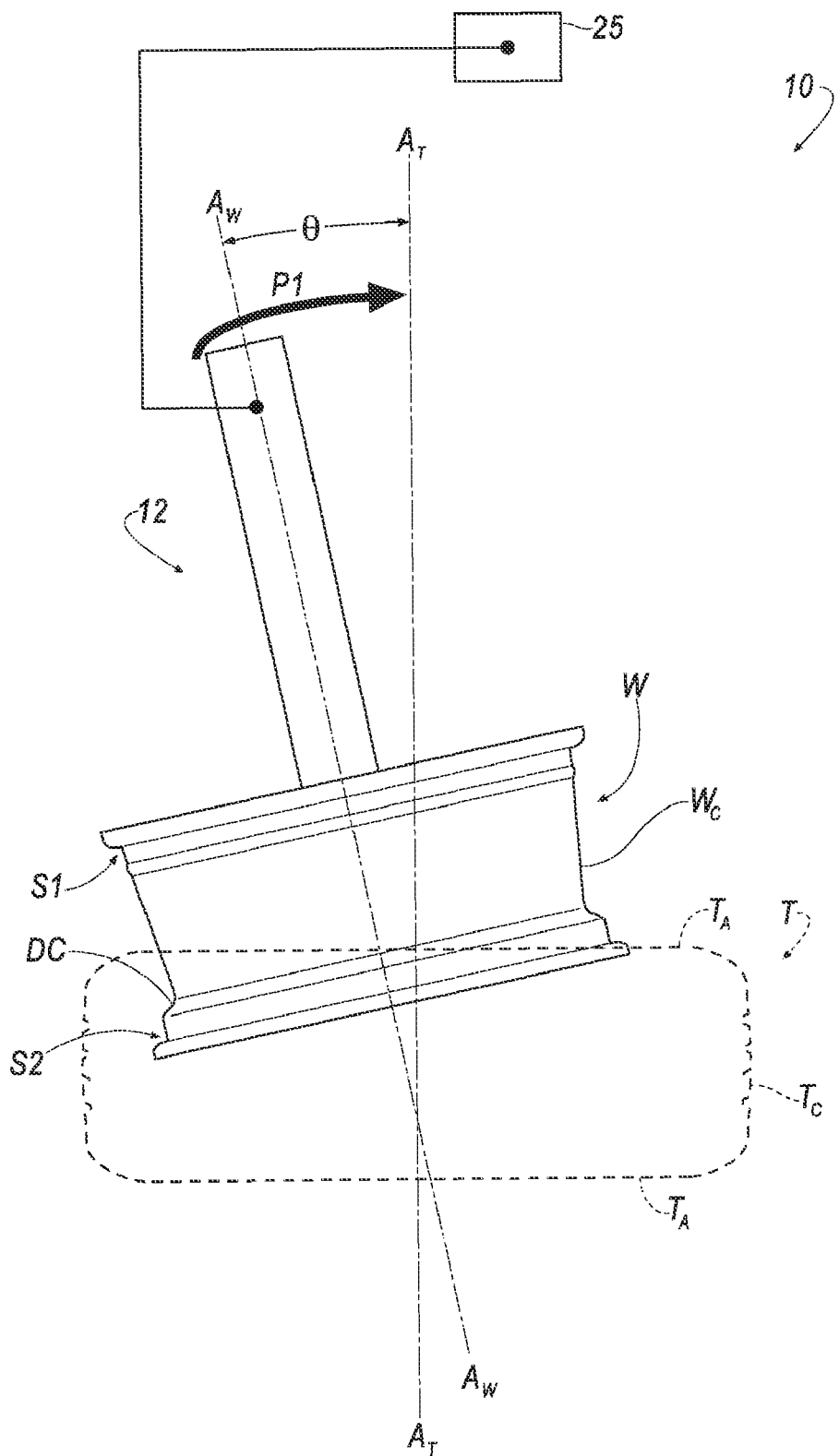
FIGS. 2A-2D show an apparatus and method for mounting a vehicle tire and a vehicle wheel in accordance with a second exemplary embodiment of the invention.

As seen in FIG. 2A, prior to the actuator 25 causing further movement of the assembly 12 and wheel, W, the actuator 25 locates the wheel, W, relative the tire, T, such that the wheel axis, $A_W$-$A_W$, is canted (i.e. not parallel to the tire axis, $A_T$-$A_T$). In an embodiment, the actuator 25 may then move the wheel support arm assembly 12 and, accordingly, the wheel, W, as well as the wheel axis, $A_W$-$A_W$, relative the tire, T, and the tire axis, $A_T$-$A_T$, sweeping out a precessional motion according to the direction of the arrows P1-P4 (FIGS. 2A-3). In general, the precessional movement, P1-P4, is defined by canting the wheel axis relative to the tire axis, and then rotating the wheel axis, $A_W$-$A_W$, about the tire axis, $A_T$-$A_T$, such that the movement of the wheel axis, $A_W$-$A_W$, about the tire axis, $A_T$-$A_T$, sweeps out an area that defines a surface of a cone.

Figure 2B:
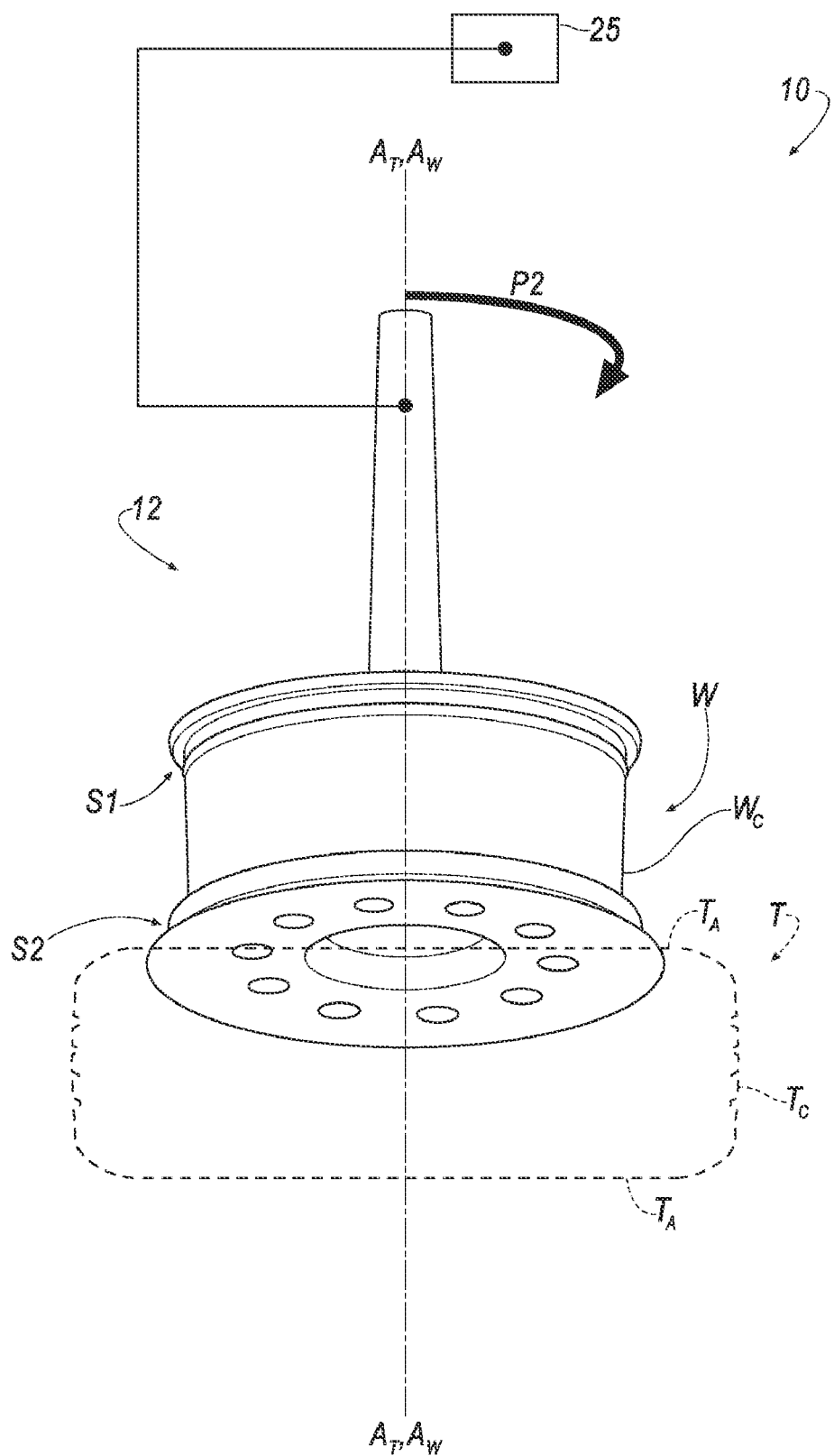
Figure 2C:
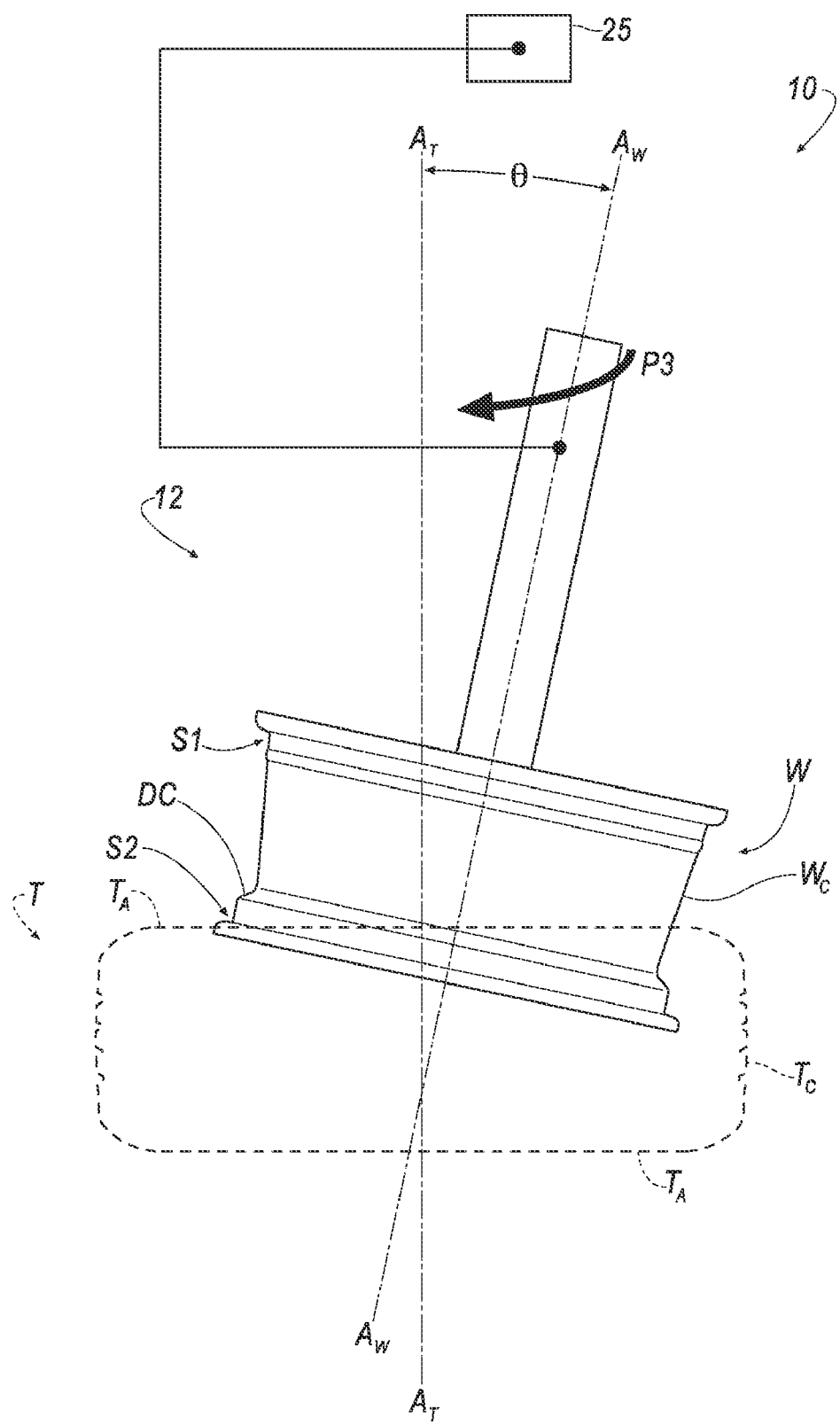
Figure 2D:
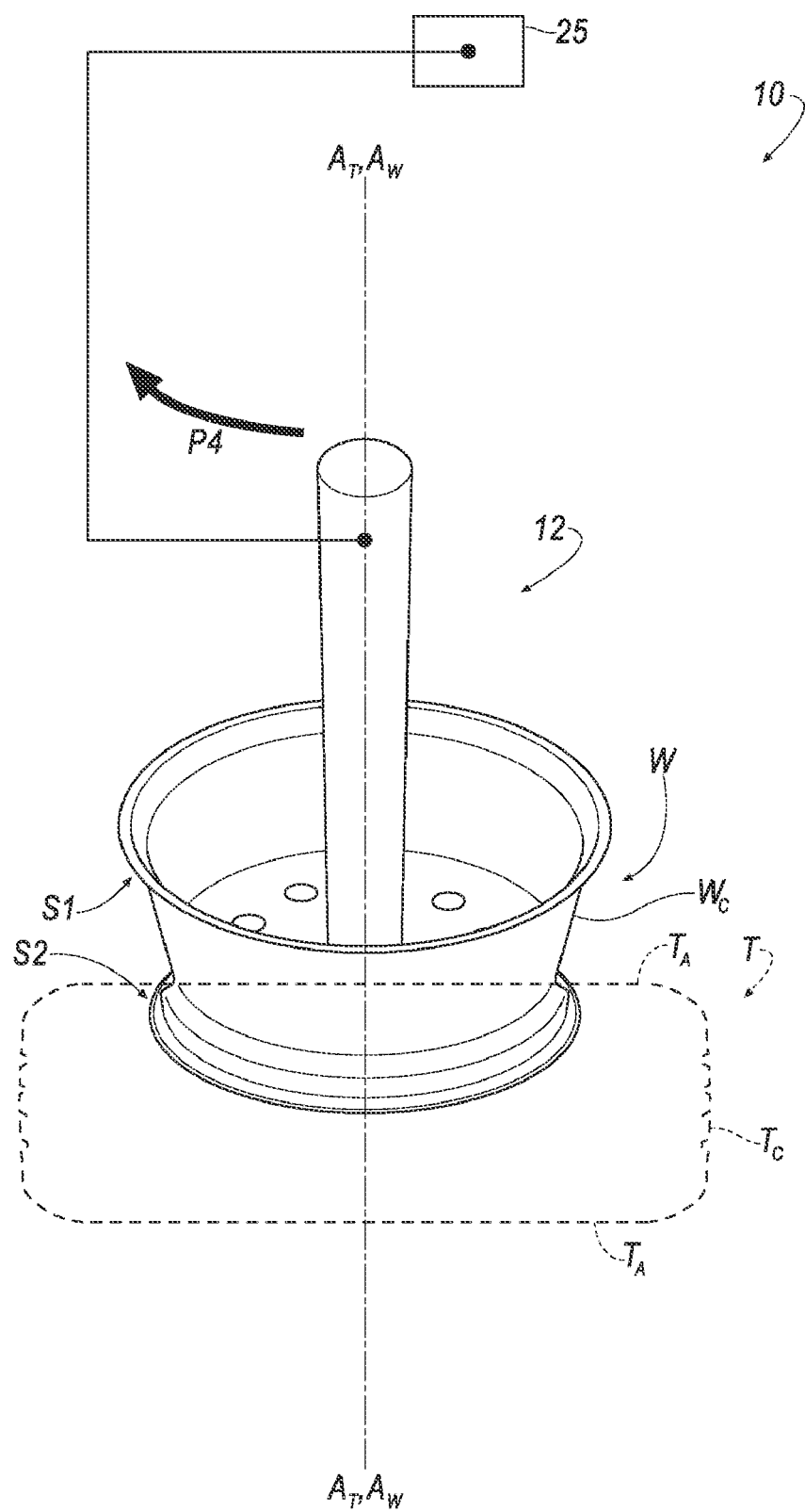

Referring first to FIG. 2A, the actuator 25 may cause the wheel support arm assembly 12 to precessionally locate the wheel, W, relative the tire, T, for example, at the "9 o'clock position" (see, e.g., FIG. 3) for precessional movement of the wheel, W, relative the tire, T, to the "12 o'clock position" (see, e.g., FIG. 3) according to the clockwise direction of the arrow, P1. Then, as seen in FIG. 2B, the actuator 25 may cause the wheel support arm assembly 12 to precessionally locate the wheel, W, relative the tire, T, for example, at the "12 o'clock position" for precessional movement of the wheel, W, relative the tire, T, to the "3 o'clock position" according to the clockwise direction of the arrow, P2. Then, as seen in FIG. 2C, the actuator 25 may cause the wheel support arm assembly 12 to precessionally locate the wheel, W, relative the tire, T, for example, at the "3 o'clock position" for precessional movement of the wheel, W, relative the tire, T, to the "6 o'clock position" according to the clockwise direction of the arrow, P3. Then, as seen in FIG. 2D, the actuator 25 may cause the wheel support arm assembly 12 to precessionally locate the wheel, W, relative the tire, T, for example, at the "6 o'clock position" for precessional movement of the wheel, W, relative the tire, T, to the "9 o'clock position" according to the clockwise direction of the arrow, P4.

Although the movement of the wheel support arm assembly 12 and wheel, W, is described in discreet steps in FIGS. 2A-2D, it will be appreciated that the precessional movement, P1-P4, may be continuous and fluid. In addition, it will be appreciated that the precessional movement, P1-P4, is not limited to a clockwise movement and that the precessional movement, P1-P4, may alternatively be conducted in the counter-clockwise direction. In addition, above references to a particular "o'clock" position of the wheel, W, and/or wheel support arm assembly 12 is made simply for convenience when correlating FIGS. 2A-2D to what is shown in FIG. 3 and that the disclosure is not limited to a particular "o'clock" reference point, starting position or ending position when mounting the tire, T, and wheel, W.

During the precessional movement, P1-P4, as shown and described in FIGS. 2A-3, at least one of the beads, B1, B2, of the tire, T, is drawn over and at least partially located about the circumference, $W_C$, of the wheel, W. In an embodiment, the first bead, B1, may be drawn over and at least partially located proximate the first bead seat, S1. Once the bead, B1, is drawn proximate the bead seat, S1, the wheel axis, $A_W$-$A_W$, and the tire axis, $A_T$-$A_T$, may be substantially co-axial. Thus, the precessional movement, P1-P4, may result in the subsequent partial or full mounting of the tire, T, and the wheel, W. Once the tire, T, is mounted to the wheel, W, the assembled, substantially co-axial tire, T, and wheel, W, may be moved to another station (not shown) for match-marking, inflating, and balancing.

During the above tire/wheel mounting operation, it will be appreciated that the tire, T, may, if desired, be retained by one of its axial end surfaces, $T_A$, or its outer circumference, $T_C$, while the wheel, W, is precessionally moved relative the tire, T, as described above. However, it will be appreciated that the reverse condition may occur in that the wheel, W, may be held constant as, the tire, T, is precessionally moved about the wheel, W.

Referring now to FIGS. 4A-5D, a system for mounting a tire, T, and a wheel, W, is shown generally at 100 according to an embodiment. The system 100 is substantially similar to the system 10 in that the system 100 incorporates a precessional movement, P1-P4, of the wheel, W, by way of an actuator 25 and wheel support arm assembly 12; however, the system 100 simultaneously compounds the precessional movement, P1-P4, of the wheel, W, via the movement of the support arm assembly 12 with an axial plunging movement of the support arm assembly 12 along an axis, which is shown generally at, $A_P$-$A_P$. The axis, $A_P$-$A_P$, is hereinafter referred to as a plunging axis.

Figure 4A:
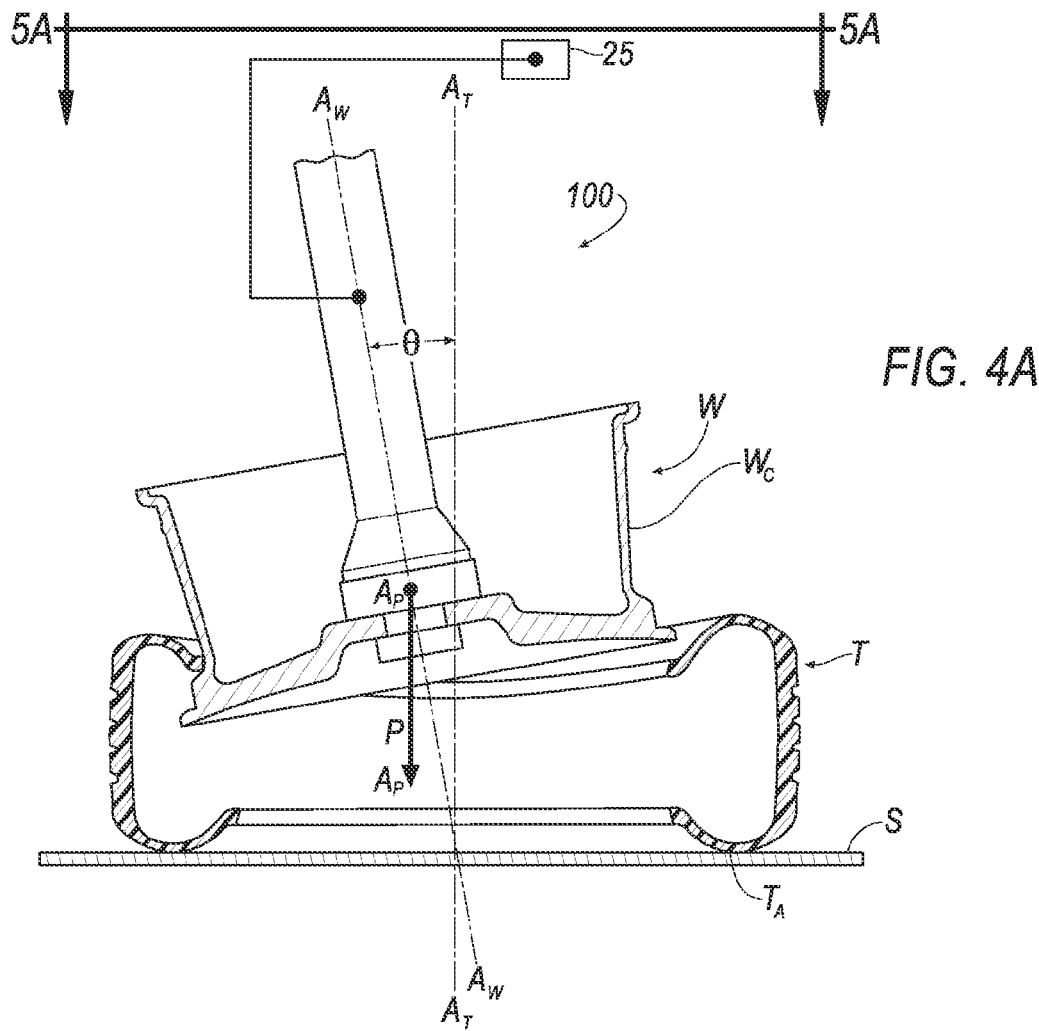
FIGS. 4A-4D illustrate a series of steps for mounting a vehicle tire and a vehicle wheel in accordance with an exemplary embodiment of the invention.
Figure 5A:
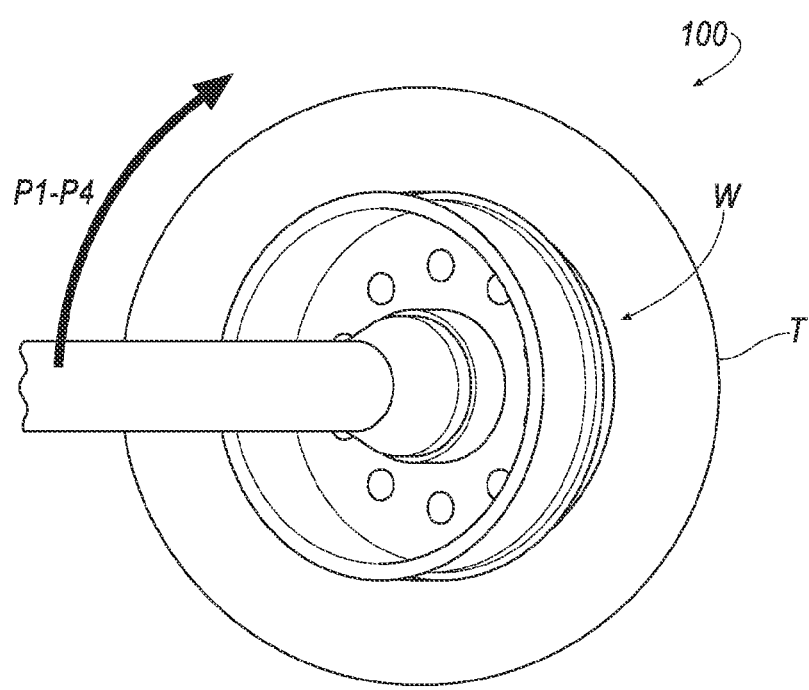
FIGS. 5A-5D illustrate a top view of the series of steps for mounting a vehicle tire and a vehicle wheel according to FIGS. 4A-4D.
Figure 4B:
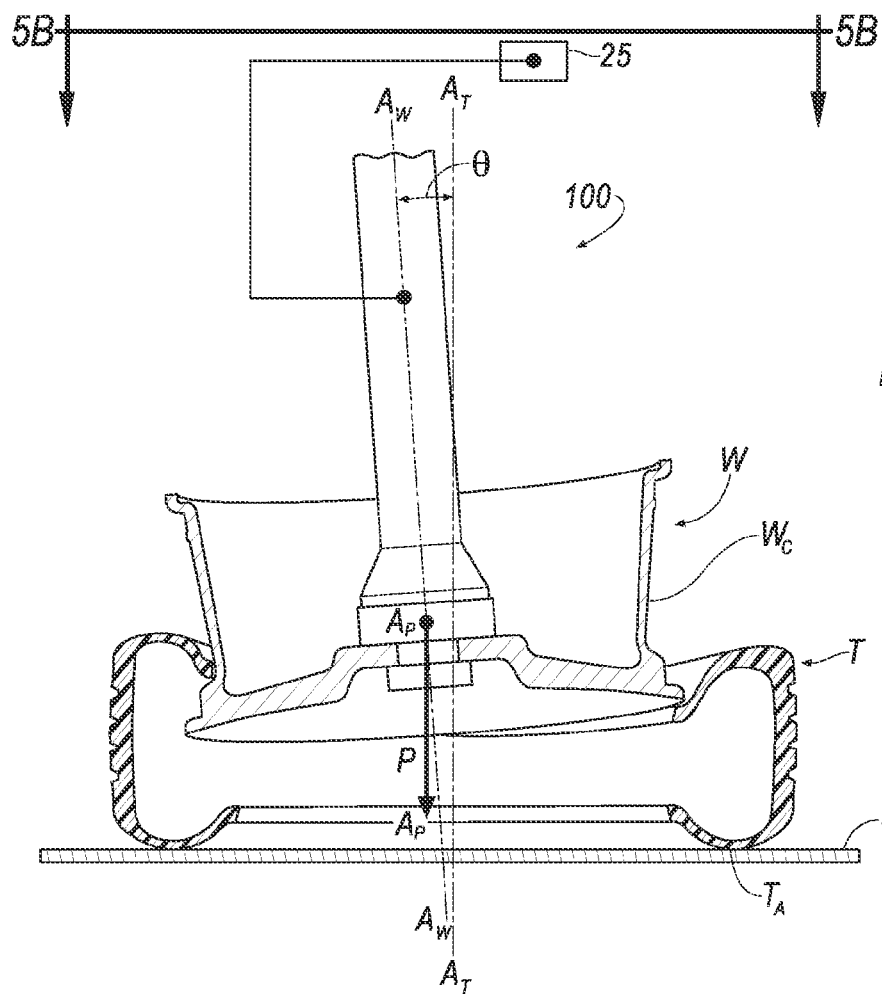
Figure 5B:
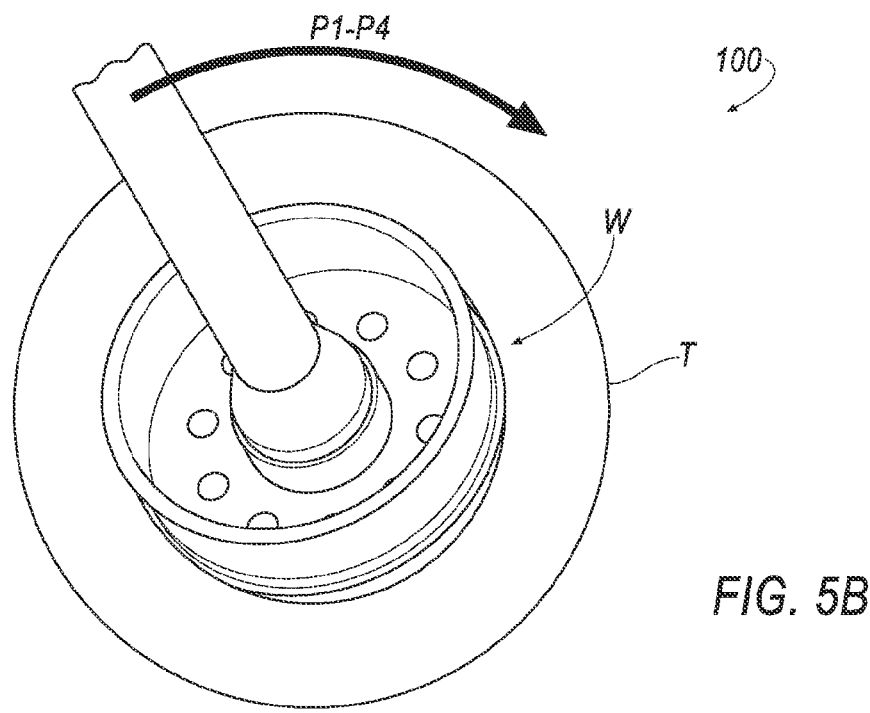
Figure 4C:
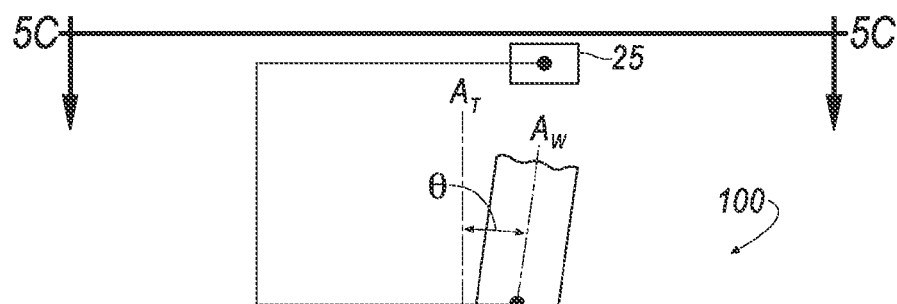
Figure 4C:
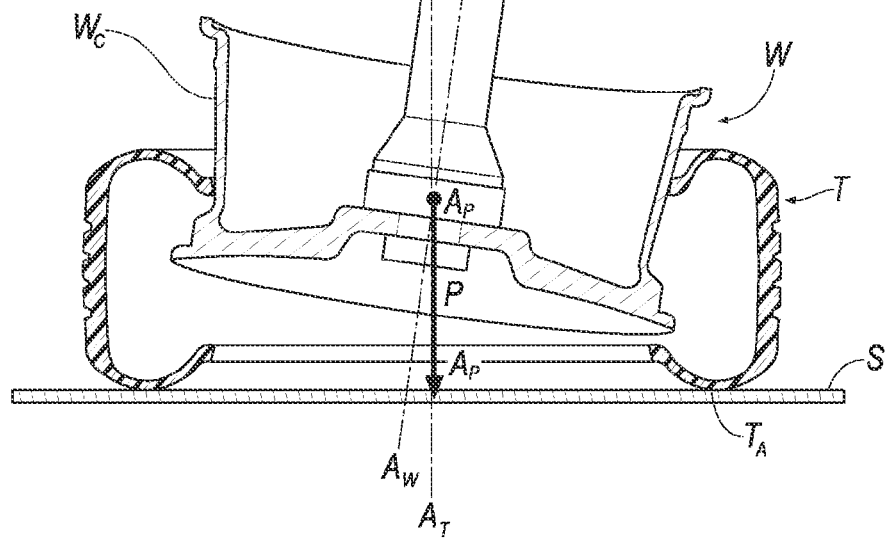
Figure 5C:
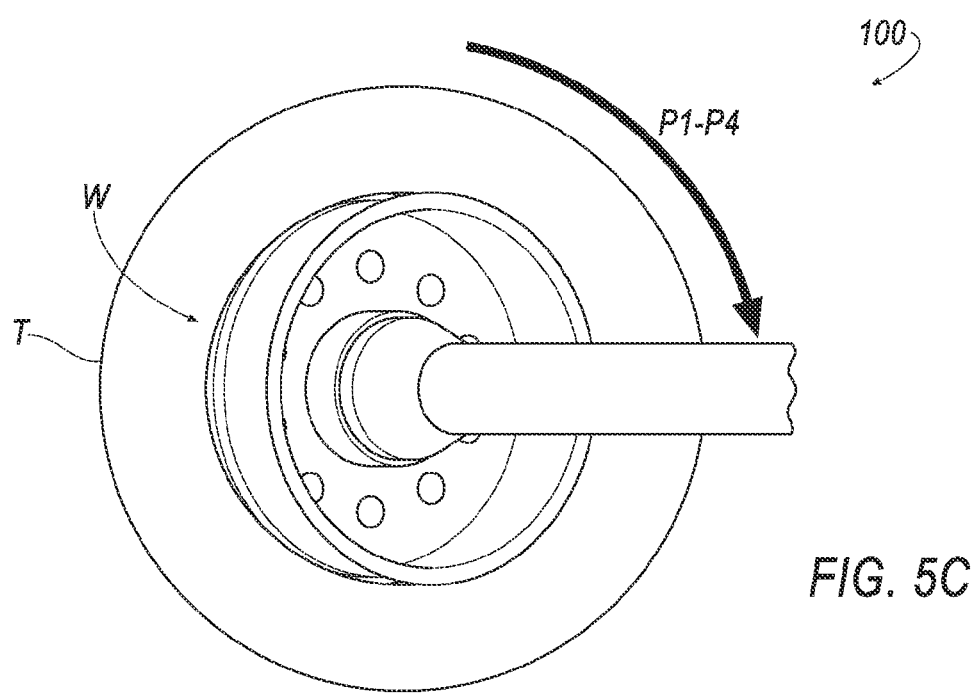

Referring to FIG. 4A, the wheel support arm assembly 12 may be positioned substantially similarly as shown and described in FIGS. 1C/2A. An axial end surface, $T_A$, of the tire, T, may be retained by and is positioned against an axial support surface, S.

As shown in FIGS. 4A-5C, the wheel support arm assembly 12 and wheel, W, may be moved in a simultaneous, compounded motion according to precessional movement as illustrated by arrows, P1-P4, and an axial plunging movement according to the direction of arrow, P, along the plunging axis, $A_P$-$A_P$. Although a compounded movement according to the direction of arrows P1-P4 and P are described above, it will be appreciated that the invention is not limited to a compounded movement of the assembly 12 and wheel, W; for example, it will be appreciated that as the wheel, W, is moved in a precessional motion, P1-P4, the tire, T, may be moved axially toward the wheel, W, such that an axial movement substantially opposite to that of the wheel, W, is assigned to the tire, T, as the axial location of the wheel, W, is held constant. Thus, it will be appreciated that the wheel, W, may be precessionally moved in axial isolation as the tire, T, is axially moved toward the wheel, W.

As seen in each subsequent Figure in FIGS. 4A-4D, as the tire, T, is advanced or otherwise mounted on to the wheel, W, by way of the compounded motion, P1-P4 and P of the wheel, W, the angular spacing of the wheel axis, $A_W$-$A_W$, and the tire axis, $A_T$-$A_T$, according to angle, θ, is reduced to approximately zero such that the wheel axis, $A_W$-$A_W$, and the tire axis, $A_T$-$A_T$, converge upon one another such that the wheel axis, $A_W$-$A_W$, and the tire axis, $A_T$-$A_T$, may be substantially co-axial.

Figure 4D:
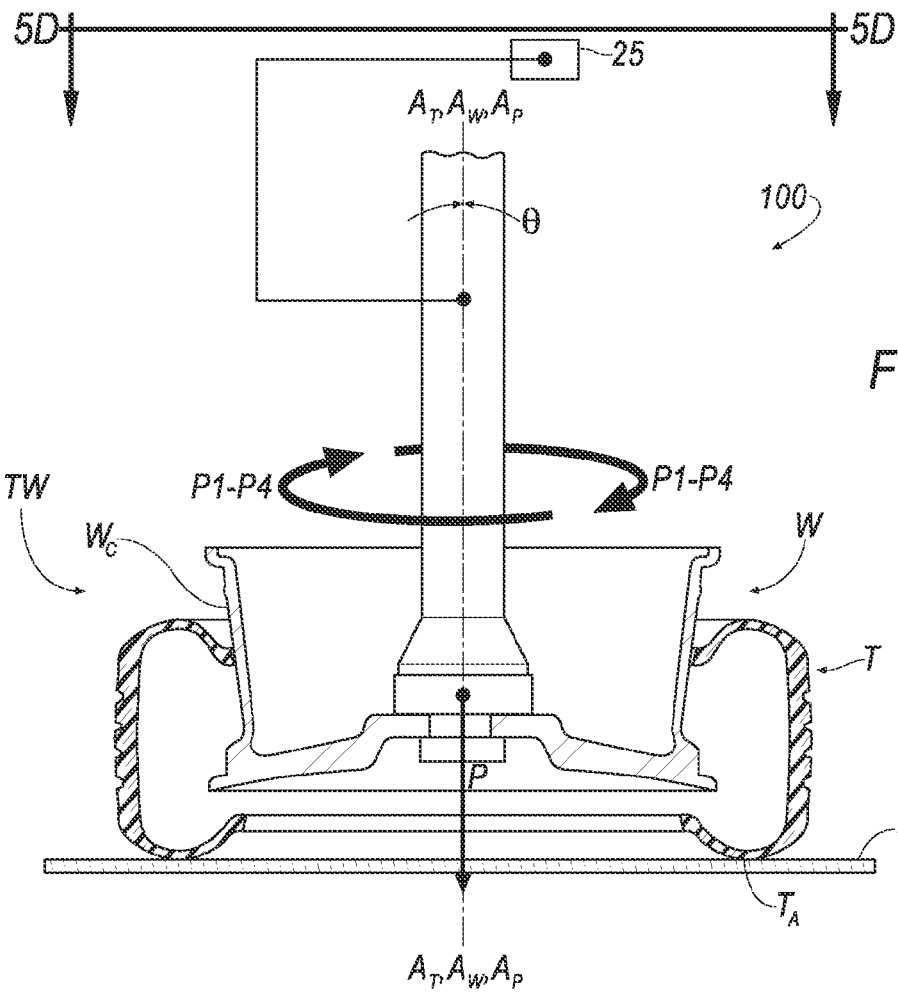
Figure 5D:
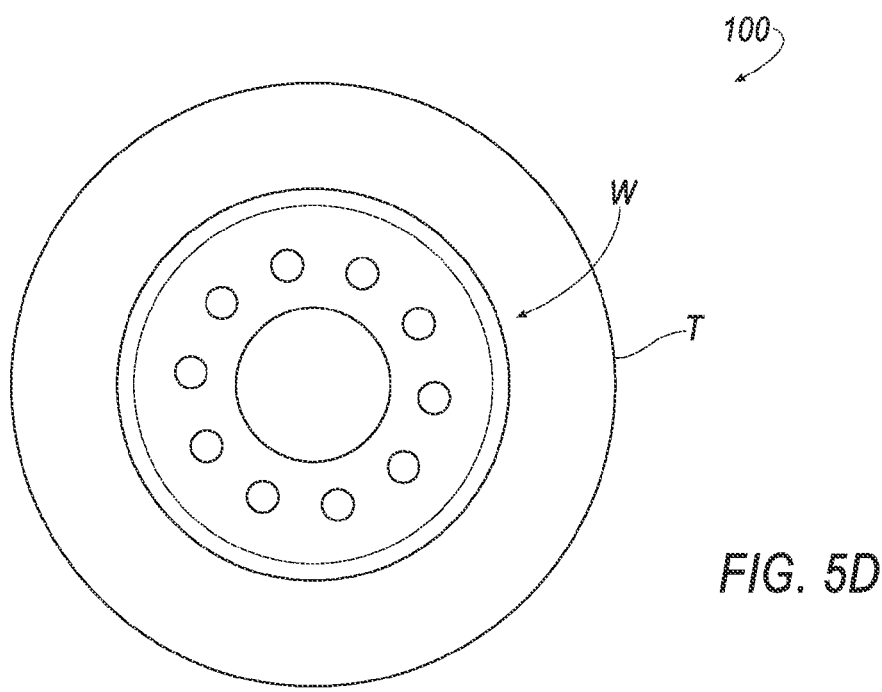
Figure 6:
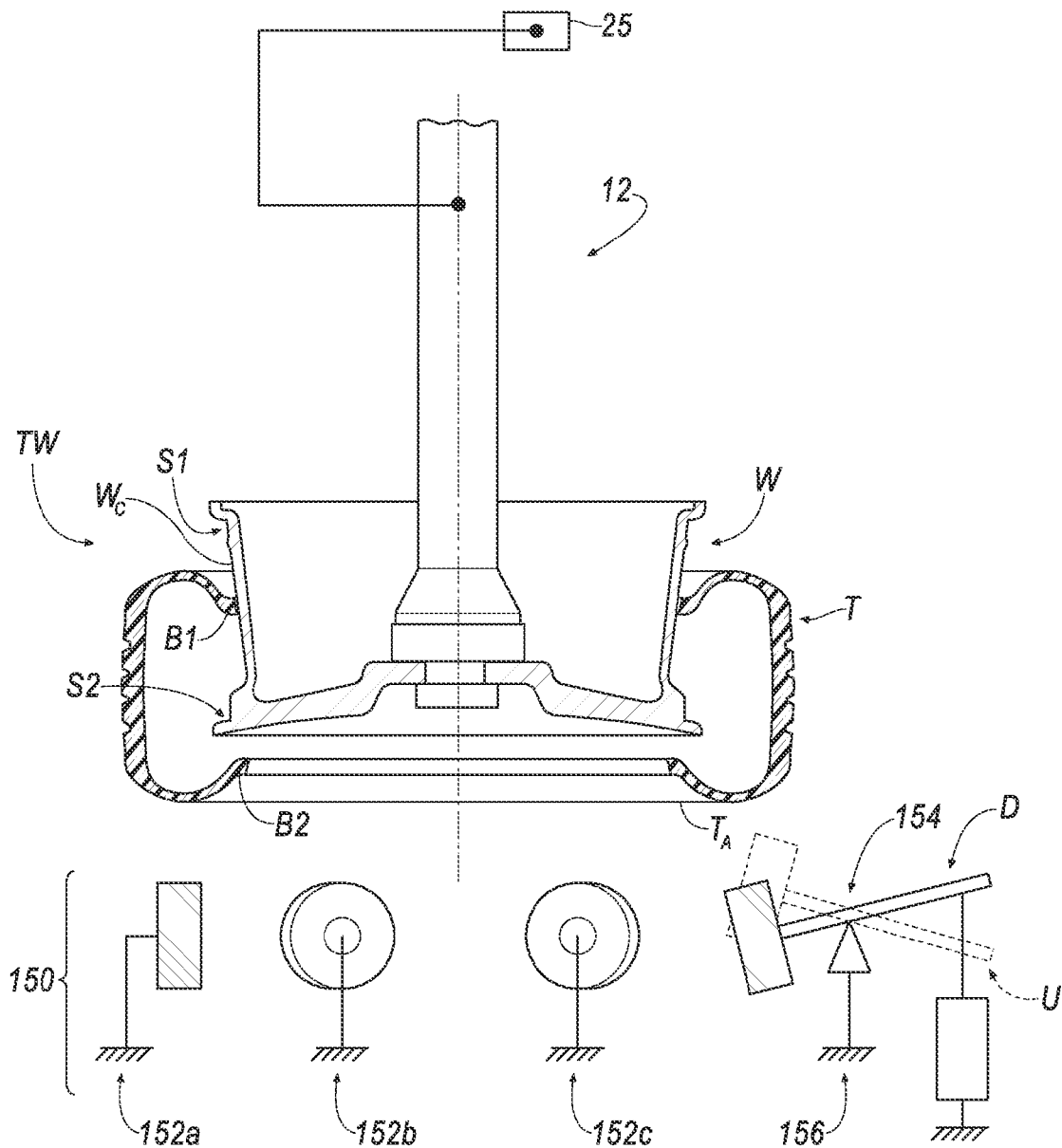
FIG. 6 illustrates an environmental view of a system for mounting a vehicle tire and a vehicle wheel in accordance with an exemplary embodiment of the invention.

As seen in FIGS. 4D and 5D, the tire, T, may be at least partially mounted to the wheel, W, such that the first bead, B1, is located about the circumference, $W_C$, of the wheel, W. Referring to FIG. 6, the wheel support assembly 12 may move the partially-mounted tire, T, relative the wheel, W, to a finishing station, which is shown generally at 150, that fully mounted the tire, T, to the wheel, W, such that the first and second beads, B1, B2, are disposed about the circumference, $W_C$, of the wheel, W.

In an embodiment, the finishing station 150 generally includes a plurality of grounded rollers, which are shown generally at 152a-152c, and a pivoting "see-saw roller," which is shown generally at 154. The see-saw roller 154 is in communication with an actuator 156 to permit a pivoting up/down "see-saw" movement of the see-saw roller 154. In an embodiment, the grounded rollers 152a-152c and the see-saw roller 154 are disposed about a circumference, $W_C$, of an axial end, $T_A$, of the tire, T.

In an embodiment, the grounded roller 152a is circumferentially positioned substantially opposite that of the see-saw roller 154. Although only three grounded rollers 152a-152c are shown, it will be appreciated that any desirable number of grounded rollers 152a-152c may be included in the design of the finishing station 150.

Figure 7A:
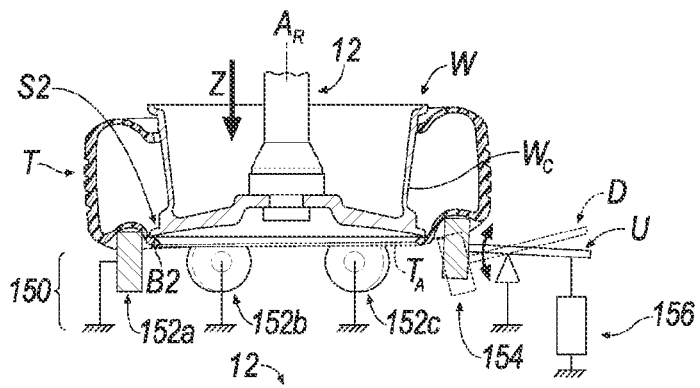
FIGS. 7A-7E illustrate a series of steps for mounting a vehicle tire and a vehicle wheel according to the system shown in FIG. 6.

In operation, referring to FIG. 7A, the wheel support assembly 12 moves the partially-mounted tire, T, and wheel, W, toward the finishing station 150 according to the direction of the arrow, Z, such that the axial end, $T_A$, of the tire, T, contacts the grounded rollers 152a-152c and see-saw roller 154. Then, the actuator 156 moves the see-saw roller 154 from a down position, D, to an up position, U, so as to urge at least a portion of the axial end, $T_A$, of the tire, T, in a direction away from the grounded rollers 152a-152c.

Figure 7B:
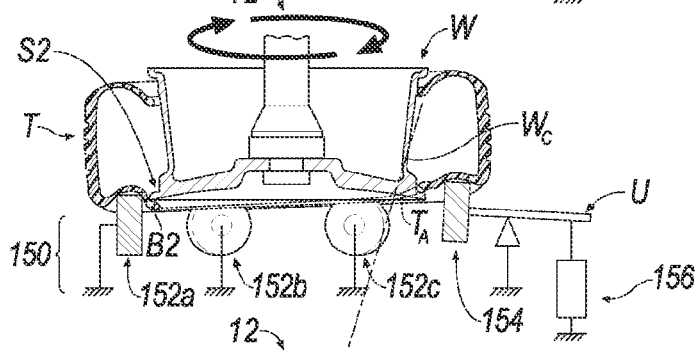

Referring to FIG. 7B, the wheel support assembly 12 rotates the partially mounted tire, T, and wheel, W, about an axis, $A_R$-$A_R$, which is substantially co-axial to the axes, $A_T$-$A_T$, $A_W$-$A_W$. The axis, $A_R$-$A_R$, is hereinafter referred to as a finishing station rotation axis. Because the axial end, $T_A$, of the tire, T, is brought in contact with the grounded rollers 152a-152c and see-saw roller 154, the rotational movement of the wheel support assembly 12 is translated from the wheel, W, and tire, T, to the grounded rollers 152a-152c and see-saw roller 154.

As the partially mounted tire, T, and wheel, W, begin to rotate about the finishing station rotation axis, $A_R$-$A_R$, the up positioning, U, of the see-saw roller 154 urges the second bead, B2, to begin to be partially disposed about the circumference, $W_C$, of the wheel, W, proximate the see-saw roller 154 (see, e.g., FIG. 7B). At this position, it may be said that the second bead, B2, is approximately 5% disposed about the circumference, $W_C$, of the wheel, W.

Figure 7C:
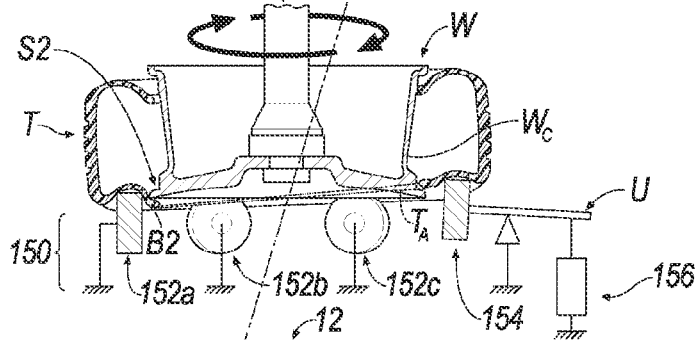

Then, as seen in FIG. 7C, the second bead, B2, is further partially disposed about the circumference, $W_C$, of the wheel, W, proximate the grounded roller 152c, which is closest to the see-saw roller 154. If desired, the actuator 156 may increase the up positioning, U, of the see-saw roller 154 so as to further urge the second bead, B2, about the circumference, $W_C$, of the wheel, W. At this position, it may be said that the second bead, B2, is approximately 10% disposed about the circumference, $W_C$, of the wheel, W.

Figure 7D:
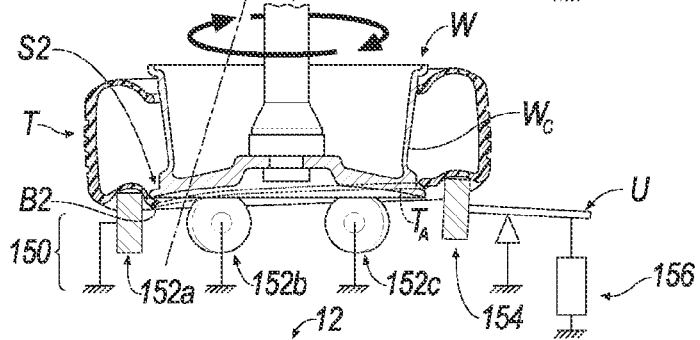

Then, as seen in FIG. 7D, the second bead, B2, is yet further partially disposed about the circumference, $W_C$, of the wheel, W, proximate the grounded roller 152b, which is further away from the see-saw roller 154 than that of the grounded roller 152c, but closer to the see-saw roller 154 than that of the grounded roller 152a. If desired, the actuator 156 may further increase the up positioning, U, of the see-saw roller 154 so as to further urge the second bead, B2, about the circumference, $W_C$, of the wheel, W. As this position, it may be said that the second bead, B2, is approximately 15% disposed about the circumference, $W_C$, of the wheel, W.

Figure 7E:
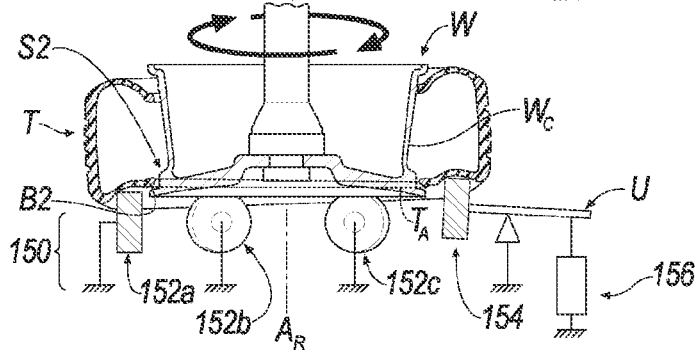
Figure 8:
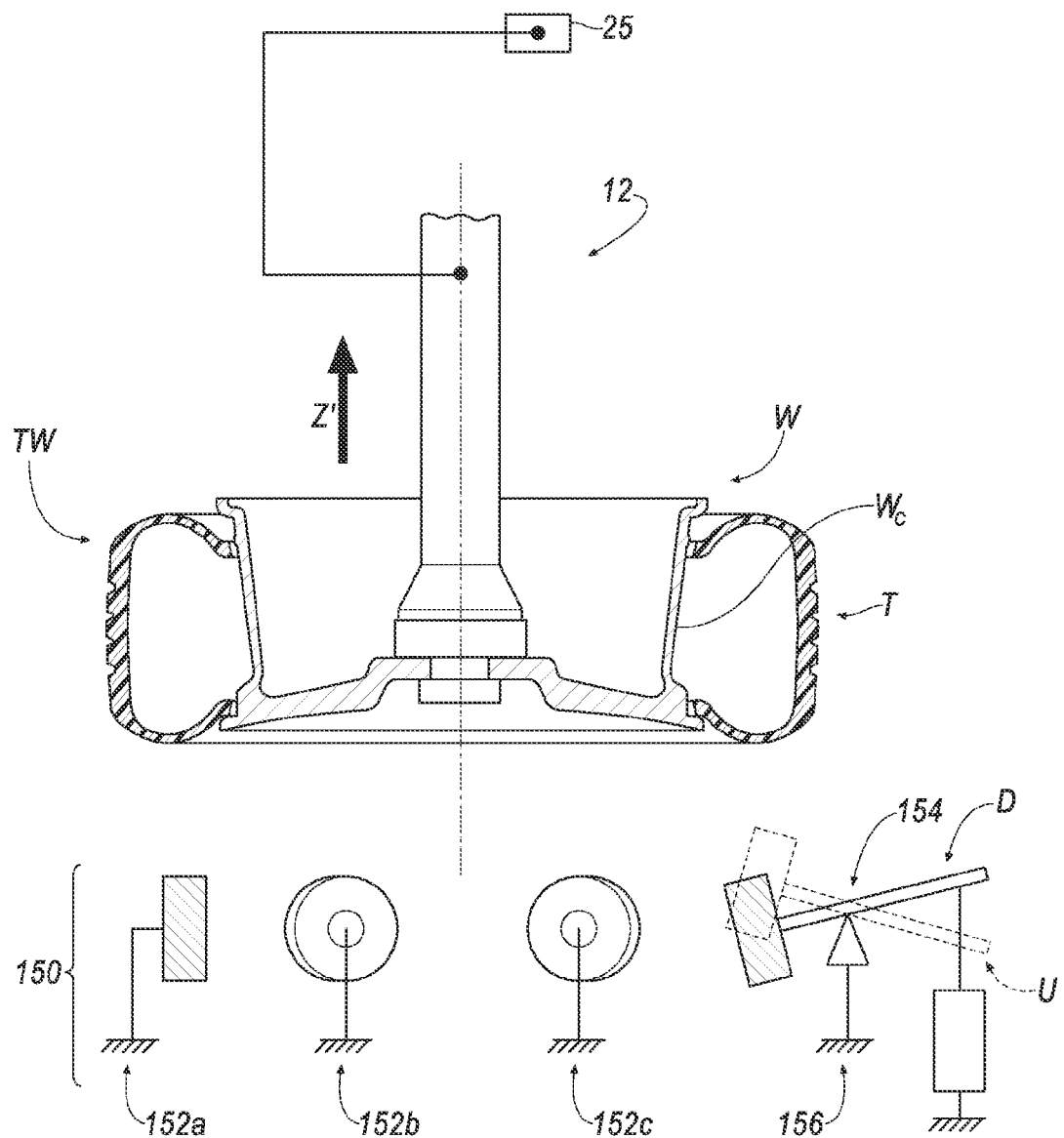
FIG. 8 illustrates an environmental view of the system of FIGS. 6-7D that mounted a vehicle tire and a vehicle wheel.

Then, as seen in FIG. 7E, the second bead, B2, may suddenly become fully disposed about the circumference, $W_C$, of the wheel, W, such that the second bead, B2, is disposed about the circumference, $W_C$, of the wheel, W, proximate the grounded roller 152a that is farthest away from the see-saw roller 154. Because the partially disposed second bead, B2, becomes exponentially disposed about the wheel, W (i.e., percentage of the second bead, B2, being disposed about the circumference, $W_C$, of the wheel, W, rises from 15% to 100%), a loud snap or pop may be heard such that an operator knows that the second bead, B2, is disposed about the circumference, $W_C$, of the wheel, W. Referring to FIG. 8, the wheel support assembly 12 is then moved according to the direction of the arrow, Z', opposite that of the arrow, Z, to move the mounted tire-wheel assembly, TW, away from the finishing station 150 for further processing at one or more subsequent match-marking/inflating/bead seating/balancing station(s).

Figure 9:
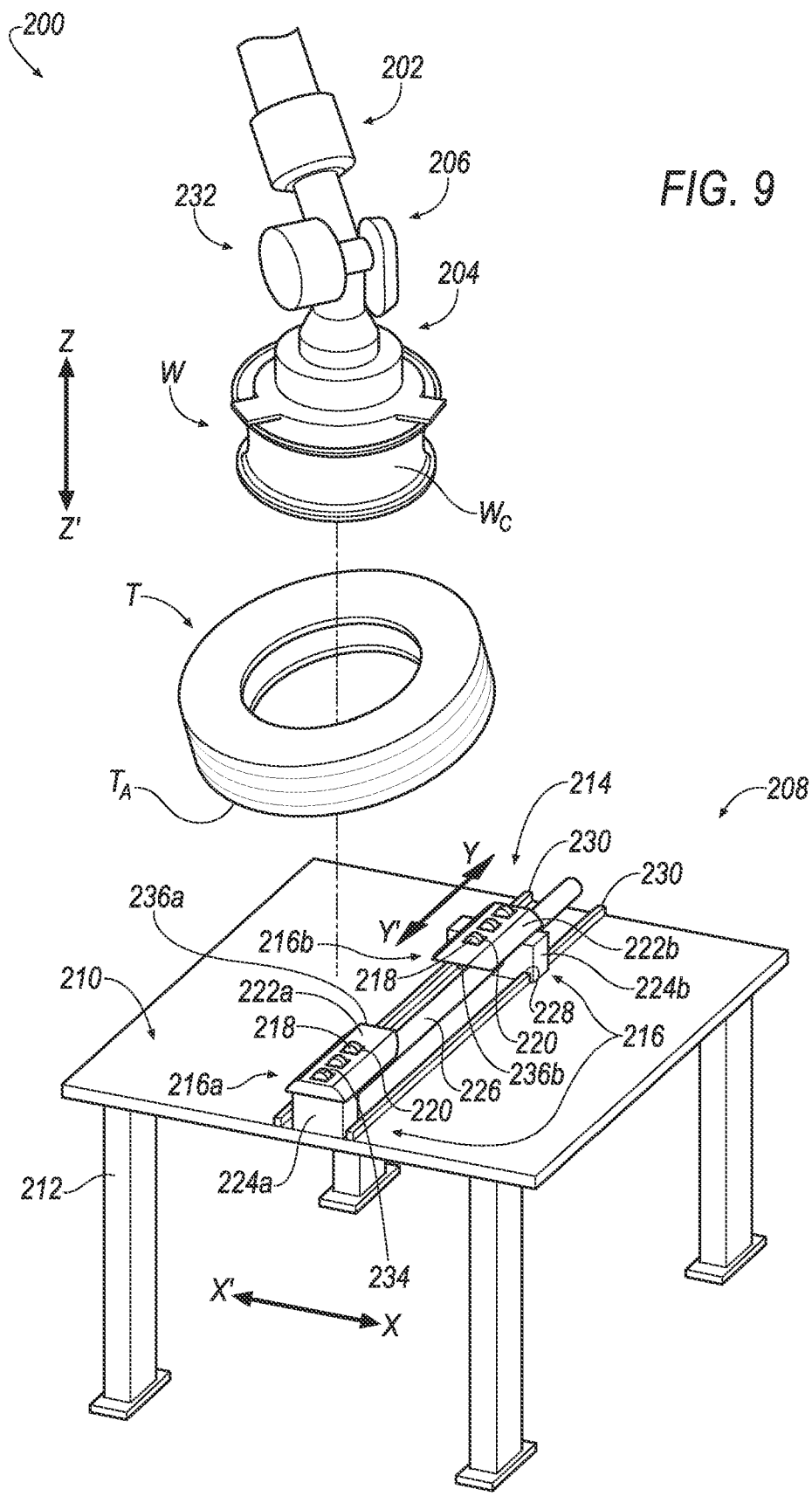
FIGS. 9-10 illustrate a perspective views of a system for mounting a vehicle tire and a vehicle wheel according to an embodiment of the invention.

Referring initially to FIG. 9, a system for mounting a tire, T, to a wheel, W, is shown generally at 200 in accordance with an embodiment of the invention. In an embodiment, the system 200 may include a robotic arm 202 including an end effector 204 located at an end 206 of the robotic arm 202. Functionally, the end effector 204 retains and releasably-fixes the wheel, W, proximate the end 206 of the robotic arm 202.

Figure 10:
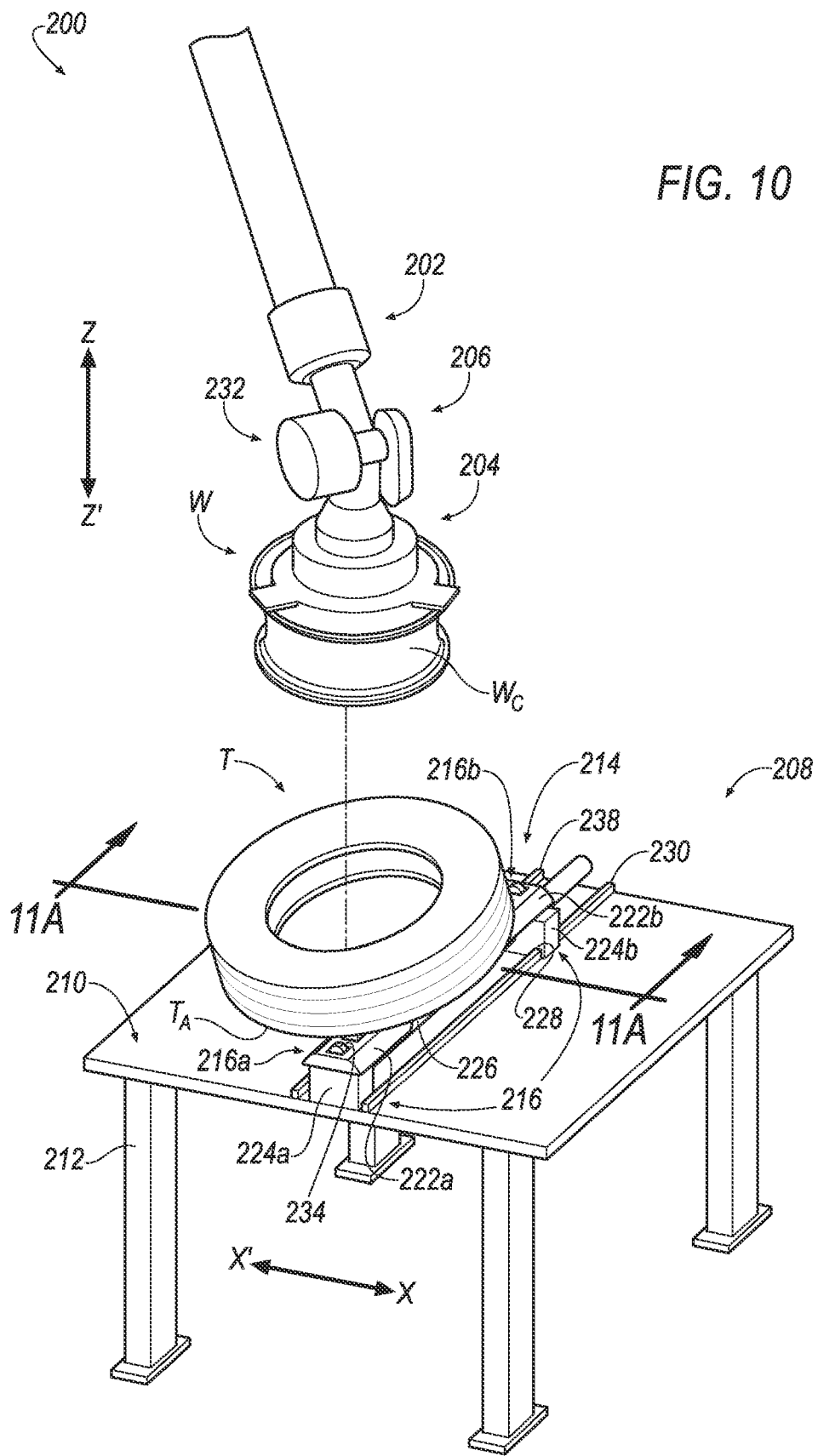

Further, in an embodiment, the system 200 may include a tire-supporting portion, which is shown generally at 208, for supporting the tire, T, as shown, for example, in FIG. 10.

In an embodiment, the tire-supporting portion 208 may be generally defined by a table including a support surface 210 supported by a plurality of legs 212. In an embodiment, the tire-supporting portion 208 may include a compounded wheel-engaging and tire-support device 214 having one or more wheel-engaging portions, which are shown generally at 216, for engaging one or more portions of a circumference, $W_C$, of the wheel, W, while supporting an axial end surface/sidewall, $T_A$, of the tire, T.

In an embodiment, the one or more wheel-engaging portions 216 include a first portion 216a and a second portion 216b. In an embodiment, the first and second portions 216a, 216b each respectively include a housing 222a, 222b. Each housing respectively contains a plurality of wheels or rollers 218 that extend through a plurality of openings 220 in each housing 222 for engaging and supporting the axial end surface/sidewall, $T_A$, of the tire, T.

In an embodiment, one or more of the first and second portions 216a, 216b may be fixed relative to the support surface 210, or, alternatively, one or more of the first and second portions 216a, 216b may be displaceable parallel to a plane generally defined by the support surface 210. In an embodiment, the first portion 216a may include vertical flange portion 224a for fixing first portion 216a relative the support surface 210. Further, in an embodiment, the second portion 216b may include vertical flange portion 224b for directly supporting displaceable portion 216b. Accordingly, in the foregoing disclosure, the first portion 216a is hereinafter referred to as a fixed portion and the second portion 216b is hereinafter referred to as a displaceable portion; however, it will be appreciated that the fixed portion 216a and displaceable portion 216b represent an embodiment of the invention and that the system 200 is not limited to include one or more fixed portions and/or displaceable portions.

In an embodiment, the displaceable portion 216b is linearly displaceable in the direction of arrow, Y-Y'. The movement of the displaceable portion 216b according to the direction of arrows, Y-Y', permits movement of the displaceable portion 216b, which is explained in greater detail.

In an embodiment, it will be appreciated that the robotic arm 202 is movable relative the tire supporting portion 208 in one or more of the direction according to the arrows, X, X', Y, Y' and Z, Z'. As illustrated, the direction according to arrows, X, X', is substantially perpendicular to the direction or arrows, Y, Y', as the direction of arrows, Z, Z', is substantially orthogonal to that of the arrows, X, X', Y, Y'.

In an embodiment, displaceable portion 216b are moveable along the direction of arrows, Y, Y', upon a substantially horizontal track 226 that is arranged substantially perpendicular to the direction of arrows, X, X'. In an embodiment, the substantially horizontal track 226 extends through a passage formed in the second substantially vertical flange 224b. In an embodiment, the substantially horizontal track 226 is also fixed/connected to the first substantially vertical flange 224a.

In an embodiment, the second substantially vertical flange 224b may include a pair of recesses 228 each receiving a rail 230 extending from the support surface 210. In an embodiment, the second substantially vertical flange 224b is guided by the rails 230 and track 226 when the second substantially vertical flange 224b is moved in either of the directions according to the arrows, Y, Y'. Vertical flange 224b can be guided along rails 230 and/or track 226 with the assistance of any friction reducing means such as ball bearings, slide bearings, lubricants or the like.

Figure 11A:
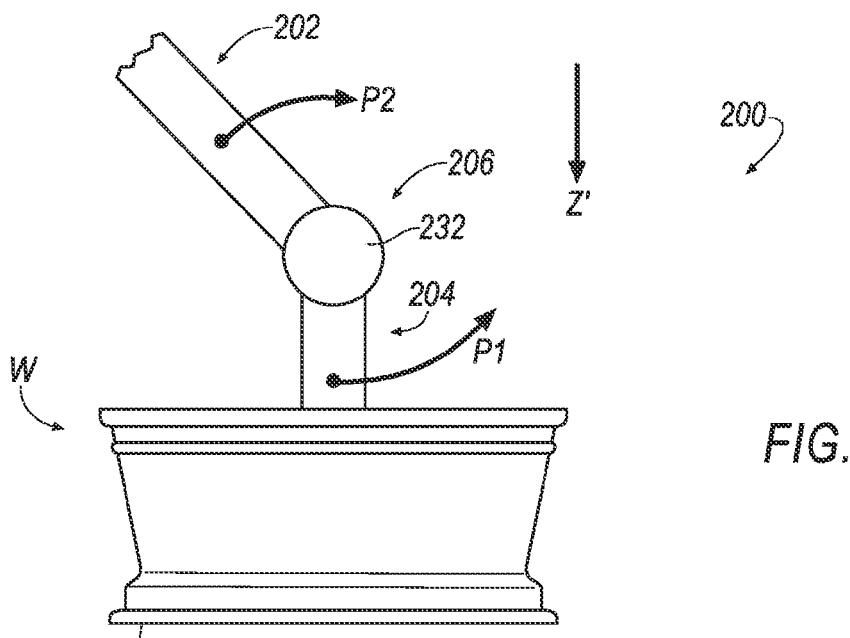
FIGS. 11A-11G is a partial cross sectional view taken substantially along lines 11A-11A of FIG. 9 illustrating a series of steps for utilizing the system of FIGS. 9-10 for mounting a vehicle tire and vehicle wheel in accordance with an exemplary embodiment of the invention.
Figure 11K:
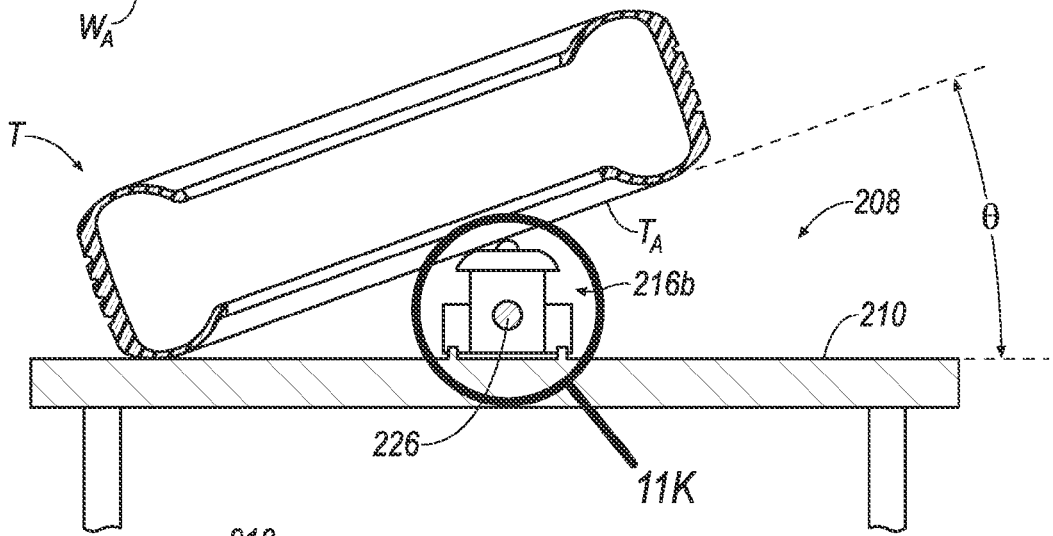
FIG. 11K is an enlargement of the correspondingly encircled portion of FIG. 11A.
Figure 11K:
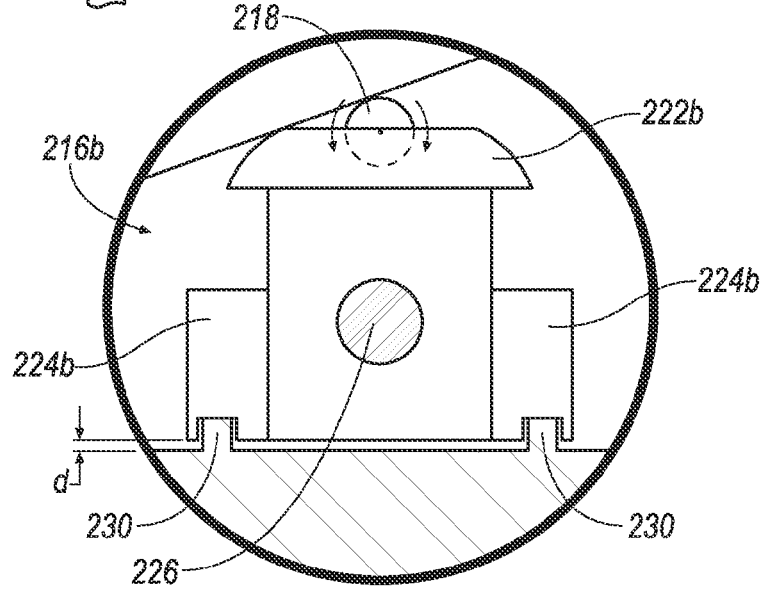

Referring now to FIG. 11A, a method for mounting a tire, T, and wheel, W, by utilizing the system 200 is described in accordance with an embodiment of the invention. In an embodiment, the wheel, W, is releasably-fixed proximate the end 206 of the robotic arm 202, and, an axial end/sidewall, $T_A$, of the tire, T, is supported in part, by a surface 210 of tire support 208, and, also in part by wheel engaging portions 216a, 216b. In an embodiment, the axial end/sidewall, $T_A$, of the tire, T, is initially canted at an angle, θ, upon the fixed and displaceable portions 216a, 216b relative the support surface 210 as an axial end/sidewall, $W_A$, of the wheel, W, is initially arranged substantially parallel to the support surface 210.

In an embodiment, movement of the robotic arm 202 may be controlled by an actuator (not shown) that is substantially similar to that as the actuator 25 described above; however, it will be appreciated that control over the movement of the robotic arm 202 is not limited to that of an actuator and that the robotic arm 202 may be controlled, moved or positioned by any desirable device in any desirable manner. Further, in an embodiment, the robotic arm 202 may include a joint/pivot point, which is shown generally at 232, that movably/pivotably connects the end effector 204 relative the robotic arm 202; as such, it will be appreciated that movement of one or more of the robotic arm 202 and end effector 204 relative the joint/pivot point 232 may be controlled, for example, by the actuator as described above.

Figure 11B:
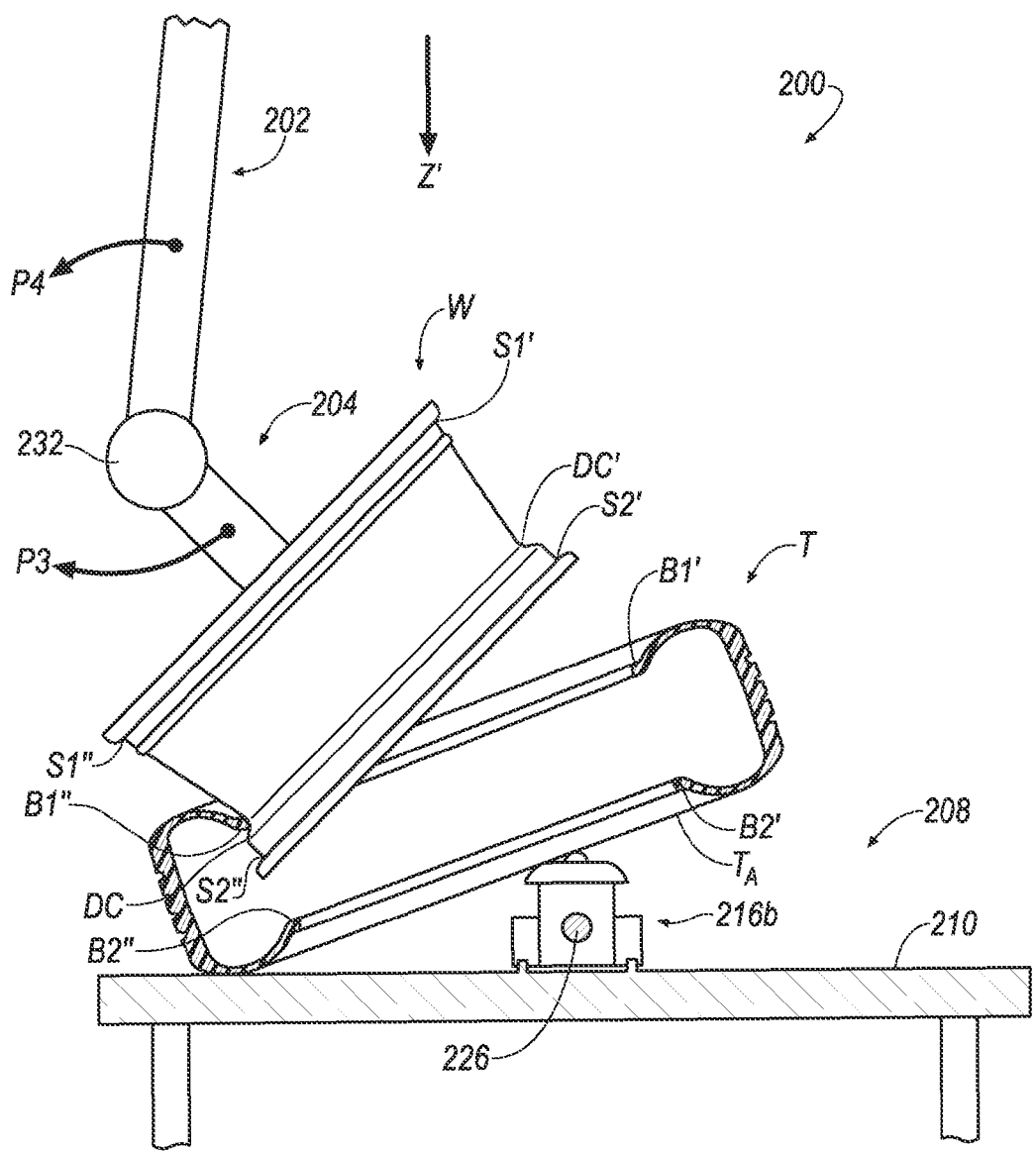

With reference to FIG. 11A, as the robotic arm 202 and end effector 204 are moved toward the tire-supporting portion 208 according generally to the direction of the arrow, Z', the end effector 204 may be pivoted counter-clockwise relative the joint/pivot point 232 according to the direction of the arrow, P1, as the robotic arm 202 is pivoted clockwise relative the joint/pivot point 232 according to the direction of the arrow, P2, in order to position the wheel, W, adjacent the tire, T, as shown in FIG. 11B. In an embodiment, as seen in FIG. 11B, movement according to the direction of the arrows, P1, P2, results in a portion of a drop center portion, DC, of the wheel, W, being moved between the first and second bead, B1, B2 of the tire, T.

Figure 11C:
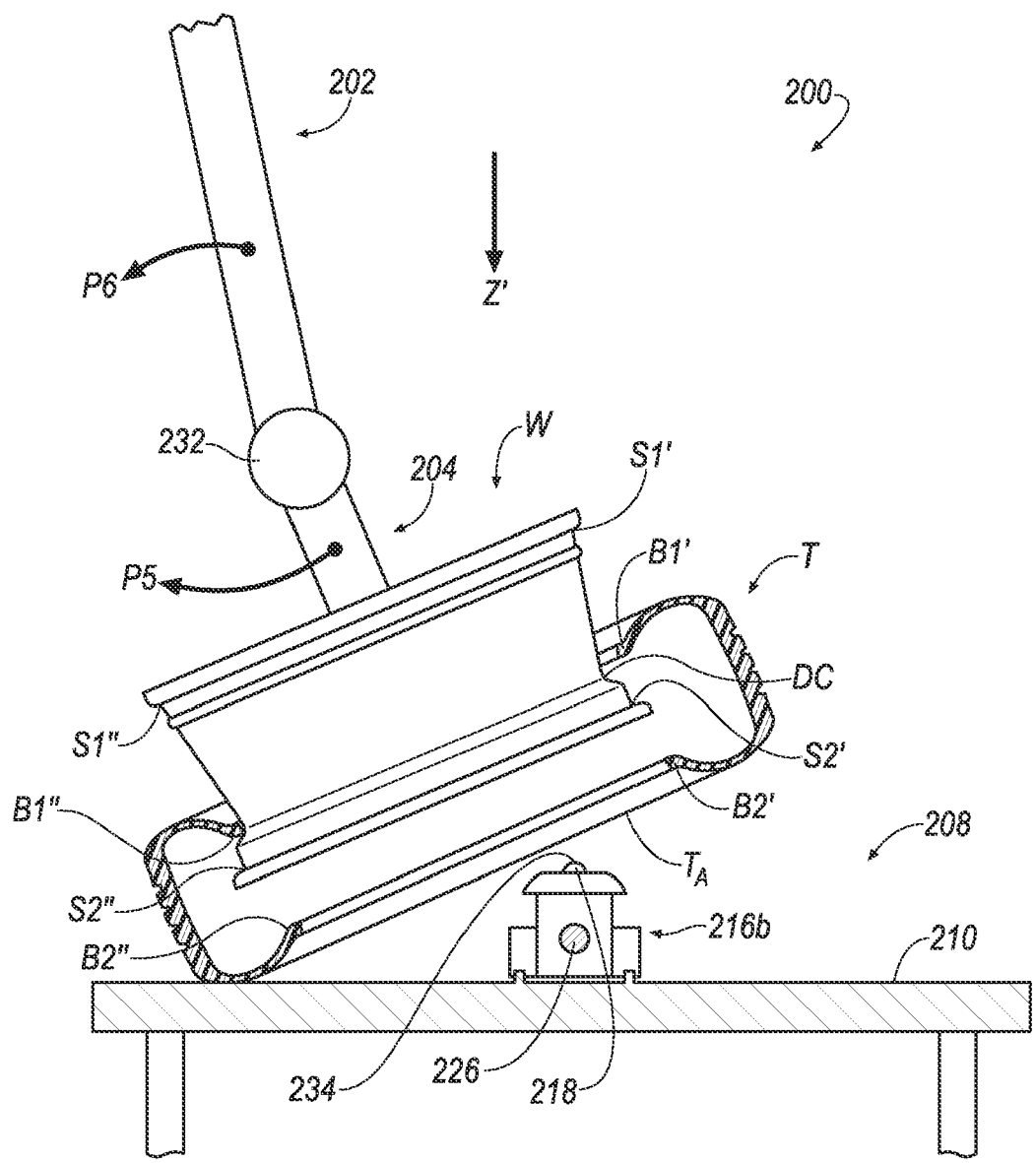

With further reference to FIG. 11B, the end effector 204 is then pivoted clockwise relative the joint/pivot point 232 according to the direction of the arrow, P3, as the robotic arm 202 is pivoted counter-clockwise relative the joint/pivot point 232 according to the direction of the arrow, P4, in order to further adjust the position the wheel, W, relative the tire, T, as shown in FIG. 11C. In an embodiment, as seen in FIG. 11C, movement according to the direction of the arrows, P3, P4, results in the entire bead seat, S (comprised of 52' and 52"), of the wheel, W, being disposed between the first and second beads, B1 (comprised of B1' and B1") and B2 (comprised of B2' and B2"), of the tire, T, as the first bead, B1, of the tire, T, is disposed between the first and second bead seats, S1, S2, of the wheel, W. Depending on the pliability of the tire (and other factors), the axial end/sidewall, $T_A$, of the tire, T, may move away from (i.e. temporarily not be supported by) the fixed and displaceable portions 216a, 216b.

Figure 11D:
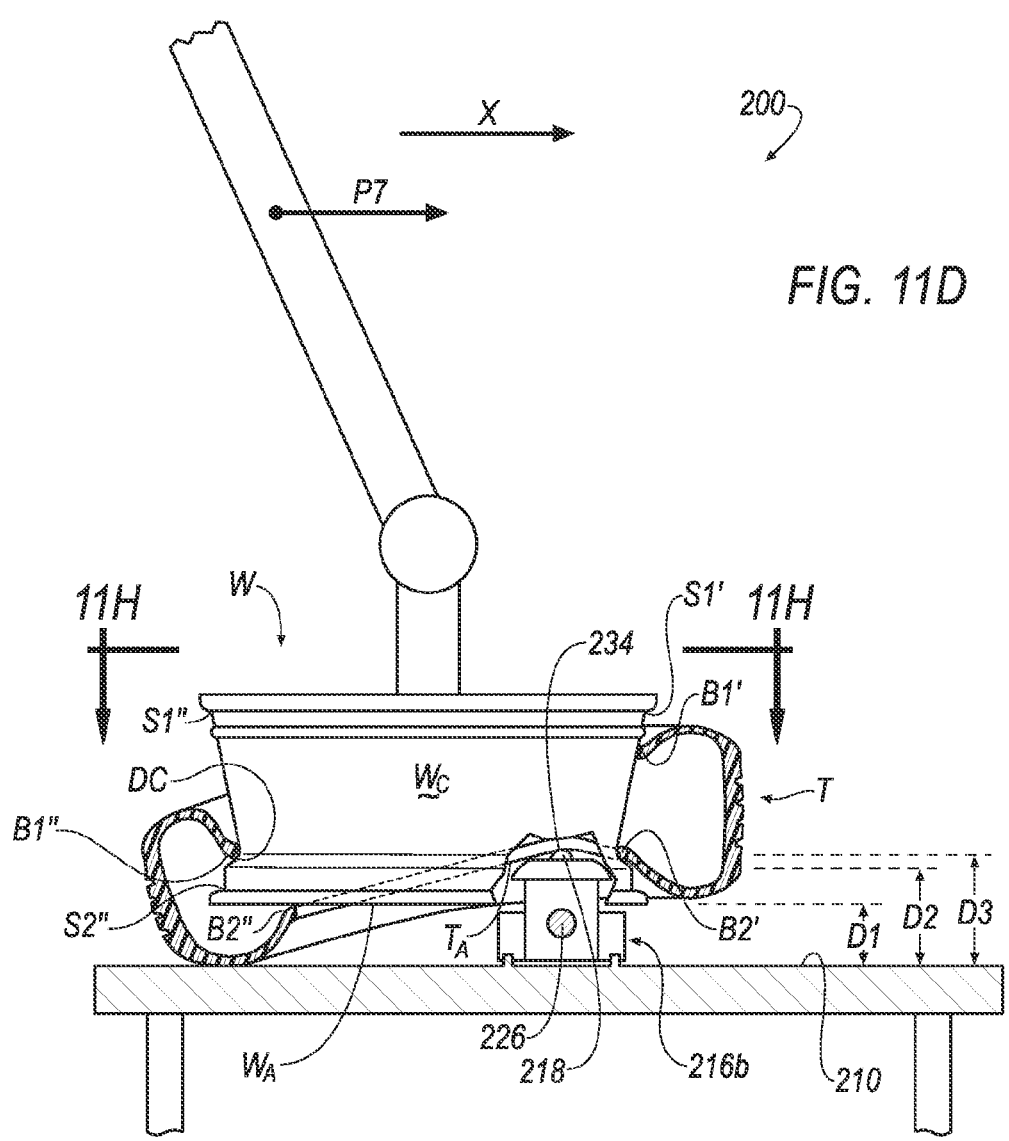

With further reference to FIG. 11C, as the robotic arm 202 and end effector 204 are moved toward the tire-supporting portion 208 according to the direction of the arrow, Z', the end effector 204 is pivoted clockwise relative the joint/pivot point 232 according to the direction of the arrow, P5, as the robotic arm 202 is pivoted counter-clockwise relative the joint/pivot point 232 according to direction of arrow, P6. In an embodiment, as seen in FIG. 11D, movement according to the direction of the arrows, P5, P6, results in movement of both of the wheel, W, and the tire, T, such that a portion of the first bead, B1', of the tire, T, is manipulated to be seated proximate the first bead seat, S1, while a second portion of the first bead, B1", of the tire, T, is moved adjacent the drop center portion, DC, proximate the second bead seat, S2", of the wheel, W. Also, movement according to the direction of the arrows, P5, P6, (see FIGS. 11D and 11H) results in movement of both of the wheel, W, and the tire, T, such that a portion of the second bead, B2' of the tire, T, is disposed proximate the drop center portion, DC, of the wheel, W, as another portion of the second bead, B2", of the tire, T, is disposed adjacent the axial end/sidewall, $W_A$, of the wheel, W.

Further, in an embodiment, as seen in FIG. 11D, movement according to the direction of the arrows, P5, P6, results in the axial end/sidewall, $W_A$, of the wheel, W, being arranged substantially parallel to and spaced at a distance, D1, away from the support surface 210 of the tire-supporting portion 208. Further, as seen in FIG. 11D, movement according to the direction of the arrows, P5, P6, results in the drop center portion, DC, of the wheel W, being spaced at a distance, D2, from the support surface 210, and, yet, even further, an uppermost point/contact surface 234 of the plurality of wheels or rollers 218 is spaced at a distance, D3, away from the support surface 210, such that the distance, D3, is approximately equal to but greater than the distance, D2.

With further reference to FIG. 11D, in an embodiment, movement according to the direction of the arrows, P5, P6 results in the tire, T, being manipulated relative the wheel, W, as follows. Firstly, in an embodiment, the contact surface 234 of one or more of the plurality of wheels or rollers 218 engages the axial end/sidewall, $T_A$, of the tire, T, to cause at least a portion of the axial end/sidewall, $T_A$, of the tire, T, to be spaced from the support surface 210 at the distance, D3. Next, the wheel W is lowered to a position D1 such that, when viewed from the top (see FIG. 11H), at least a portion of the outer periphery of the wheel W is located between wheel engaging portions 216a and 216b.

Figure 11H:
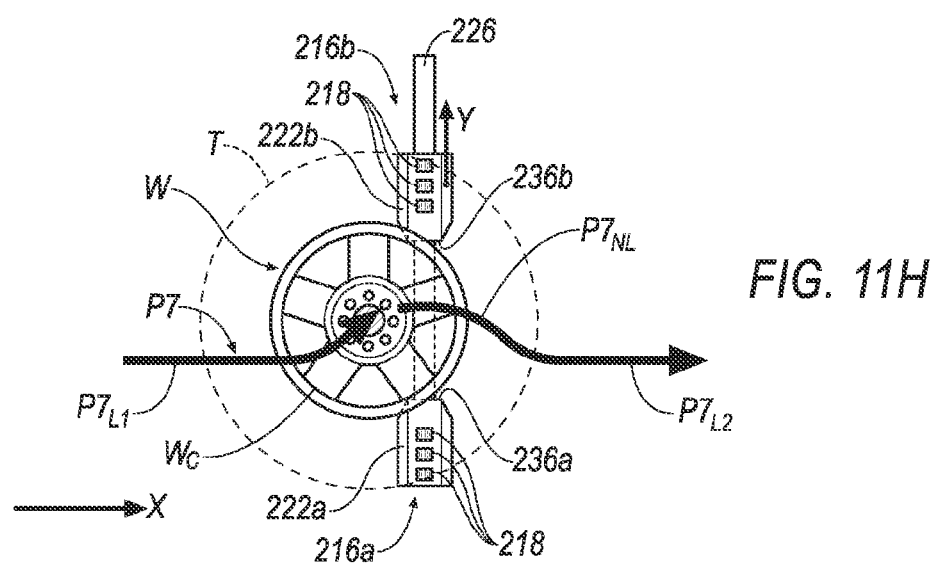
FIGS. 11H-11J illustrates a series of top view of the system according to lines 11H-11J of FIGS. 11D-11F in accordance with an exemplary embodiment of the invention.
Figure 11E:
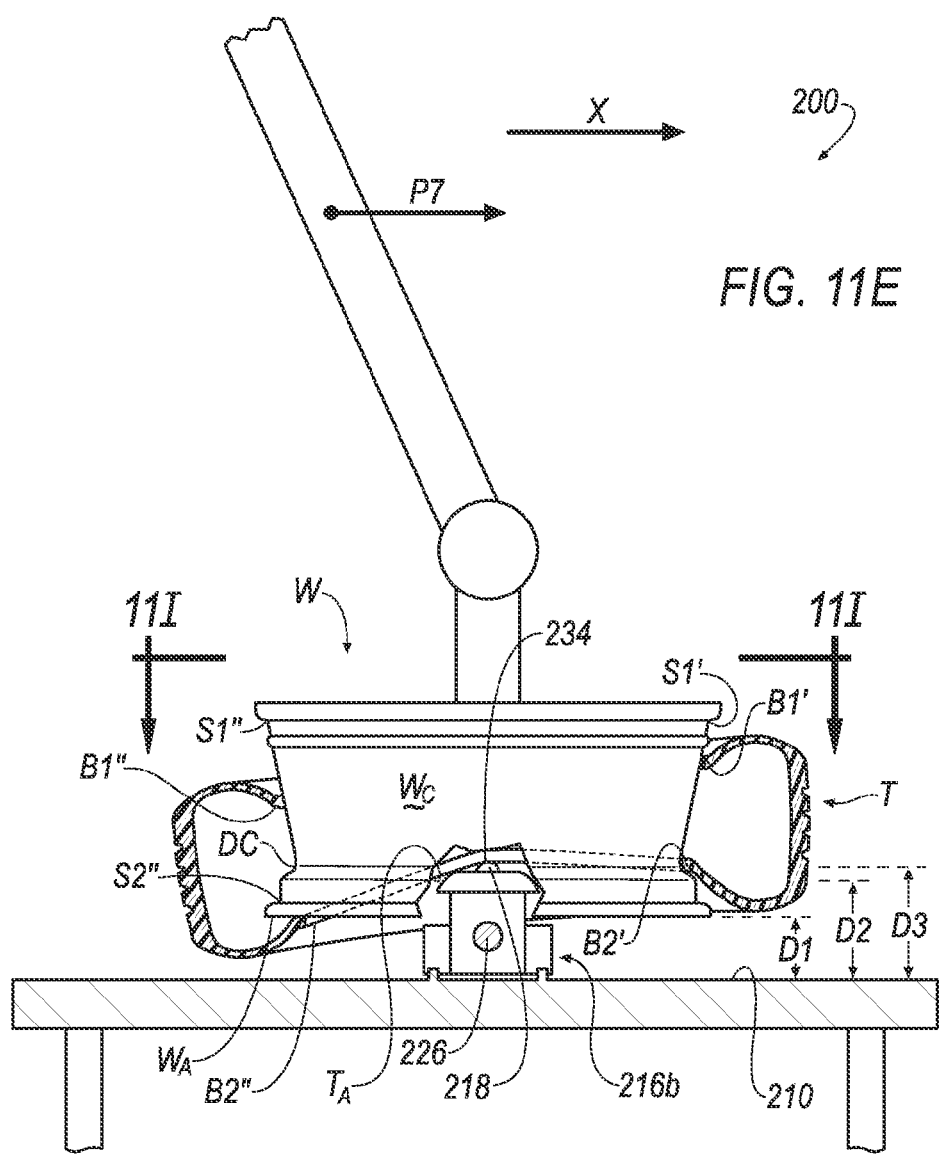
Figure 11I:
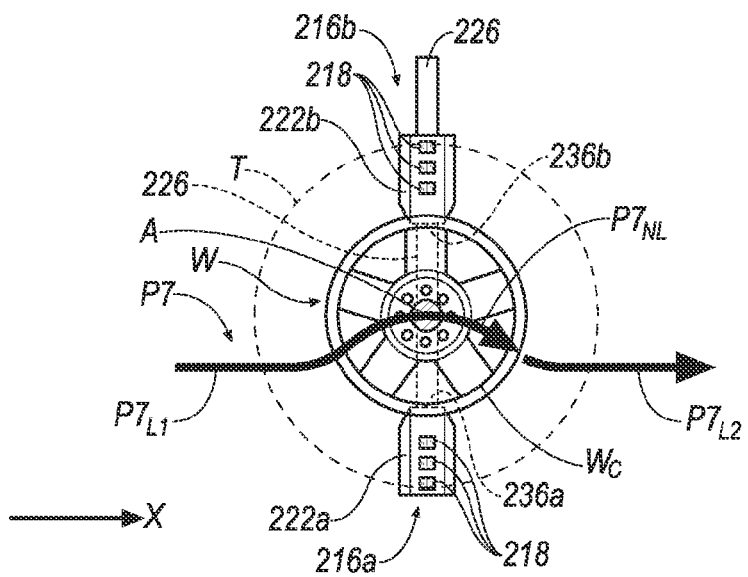
Figure 11F:
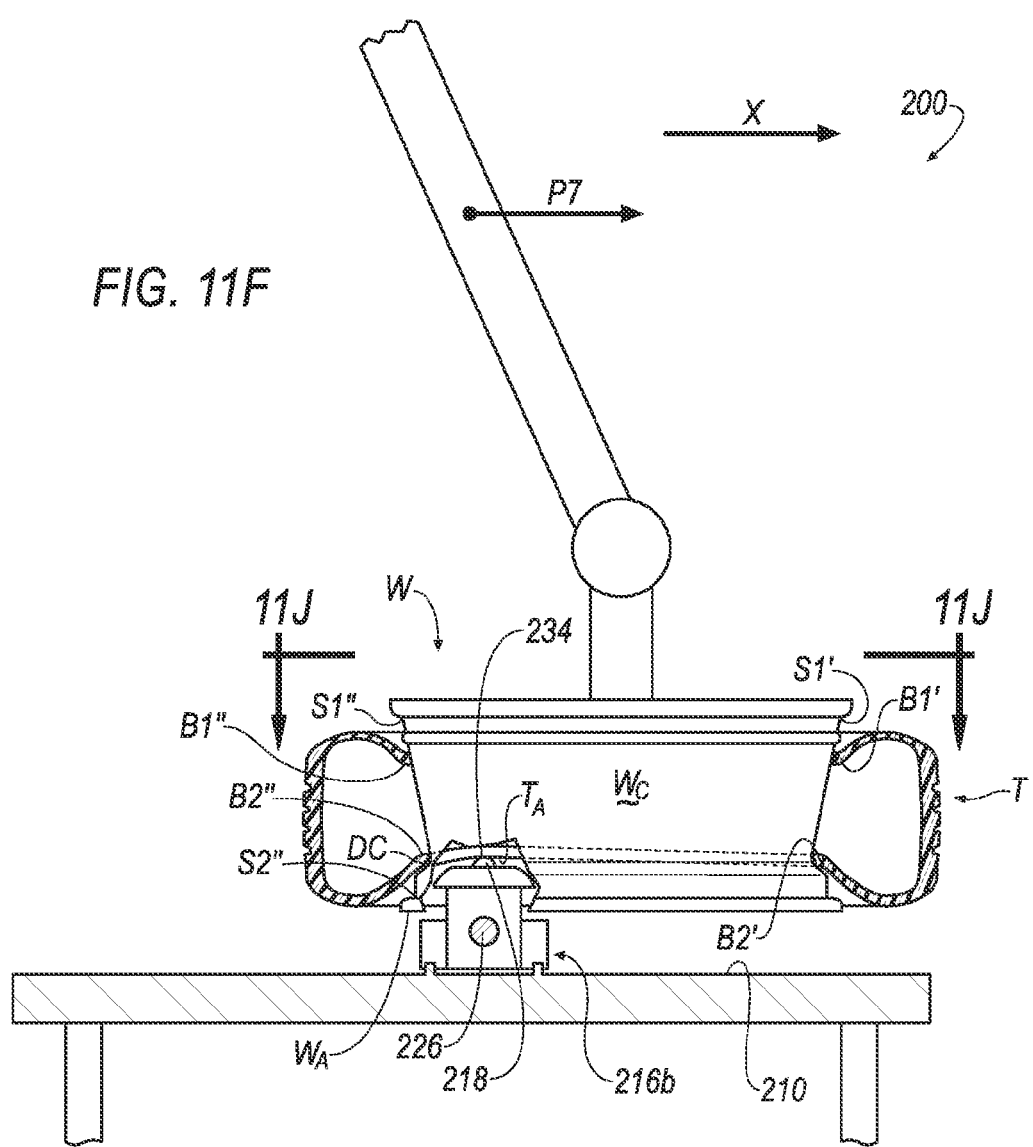

As seen in FIGS. 11D-11F, in an embodiment, the robotic arm 202 is then moved across the tire-supporting portion 208 according to the direction of arrow, P7, while maintaining the spacing between the axial end/sidewall, $W_A$, of the wheel, W, and the support surface 210 of the tire-supporting portion 208 according to the distance, D1. Further movement according to the direction of the arrow, P7, as seen, for example, in FIGS. 11E and 11F, causes further manipulation of the axial end/sidewall, $T_A$, of the tire, T, relative the upper-most point/contact surface 234 of the plurality of wheels or rollers 218 as described above for further seating the second bead, B2, of the tire, T, at least proximate the second bead seat, S2, of the wheel, W.

In an embodiment, as seen in FIGS. 11D-11F, the arrow, P7, is generally orientated in the same direction as that of the arrow, X. However, referring to FIGS. 11H-11J, in an embodiment, movement of the robotic arm 202 according to the direction of the arrow, P7, may include one or more substantially linear segments, $P7_{L1}$, $P7_{L2}$, according to the direction of the arrow, X, and one or more substantially non-linear segments, $P7_{NL}$, that includes a component of each of the arrows, X and Y (see, e.g., FIG. 11H), or, alternatively, a component of each of the arrows, X and Y' (see, e.g., FIG. 11J).

In an embodiment, for example, the substantially non-linear segment, $P7_{NL}$, of the arrow, P7, results from a portion of the circumference, $W_C$, of the wheel, W, engaging and moving around (or "rolling over") an edge surface 236a of the housing 222 of the fixed portion 216a. In an embodiment, the circumference, $W_C$, of the wheel, W, may include one or more of the second bead seat, S2, or drop center portion, DC, of the wheel, W. Although it is described above that the circumference, $W_C$, of the wheel, W, "rolls over" the edge surface 236a, it will be appreciated that the wheel, W, does not necessarily "roll" relative the housing 222 or relative to the wheel's axis of rotation, A, but rather, the robotic arm 202 and end effector 204 is moved along the path generally defined by substantially non-linear segment, $P7_{NL}$, such that an appearance of the wheel "rolling over" the edge surface 236a is provided. However, although it is described that the wheel, W, does not "roll" relative the housing 222, it will be appreciated that one or more of the robotic arm 202 and end effector 204 may be moved in any desirable manner in order to permit the wheel, W, to move according to the direction of the arrows, P1-P7.

As seen in FIG. 11H, as the portion of the circumference, $W_C$, of the wheel, W, engages and "rolls over" the edge surface 236a of the fixed portion 216a, the corresponding edge surface 236b of the displaceable portion 216b also contacts a portion of the circumference, $W_C$, of the wheel, W, that directly opposes the portion of the circumference, $W_C$, of the wheel, W, contacting the edge surface 236a of the fixed portion 216a. Accordingly, as the wheel, W, "rolls over" the edge surface 236a of the fixed portion 216a and is moved along the non-linear segment, $P7_{NL}$, the displaceable portion 216b is pushed away from the fixed portion 216a according to the direction of the arrow, Y, by a portion of the circumference, $W_C$, of the wheel, as circumference $W_C$ of wheel W, engages the edge surface 236b of the displaceable portion 216b.

Figure 11J:
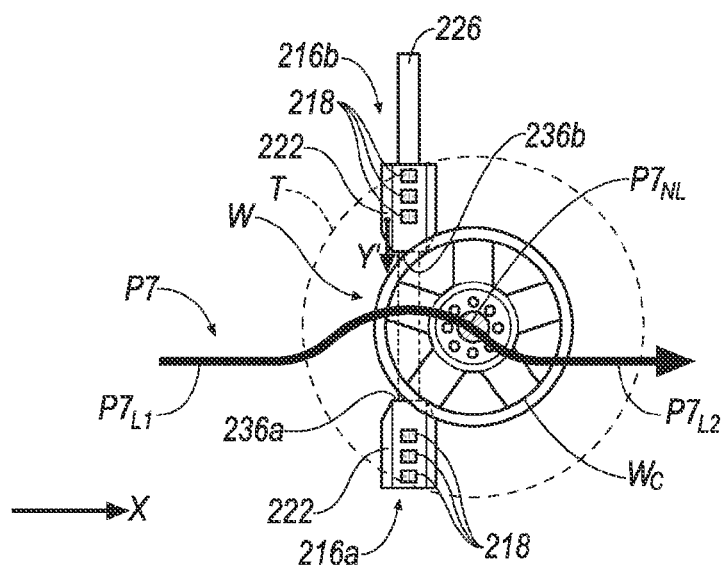

As seen in FIG. 11I, movement along the non-linear segment, $P7_{NL}$, generally peaks when an axial center, A, of the wheel, W, passes over the substantially horizontal track 226 such that the displaceable portion 216b is no longer moved away from the fixed portion 216a according to the direction of the arrow, Y. Then, as seen in FIG. 11J, further movement along the non-linear segment, $P7_{NL}$, is continued such that the displaceable portion 216b is moved toward the fixed portion 216a according to the direction of the arrow, Y', which is opposite the direction of the arrow, Y, until the edge surfaces 236a, 236b of the fixed and displaceable portions 216a, 216b no longer contacts opposing portions of the circumference, $W_C$, of the wheel, W (see, e.g., FIG. 11G). Movable portion 216b can be biased, such as by using a spring, (not shown) so that it is urged toward fixed portion 216a.

Figure 11G:
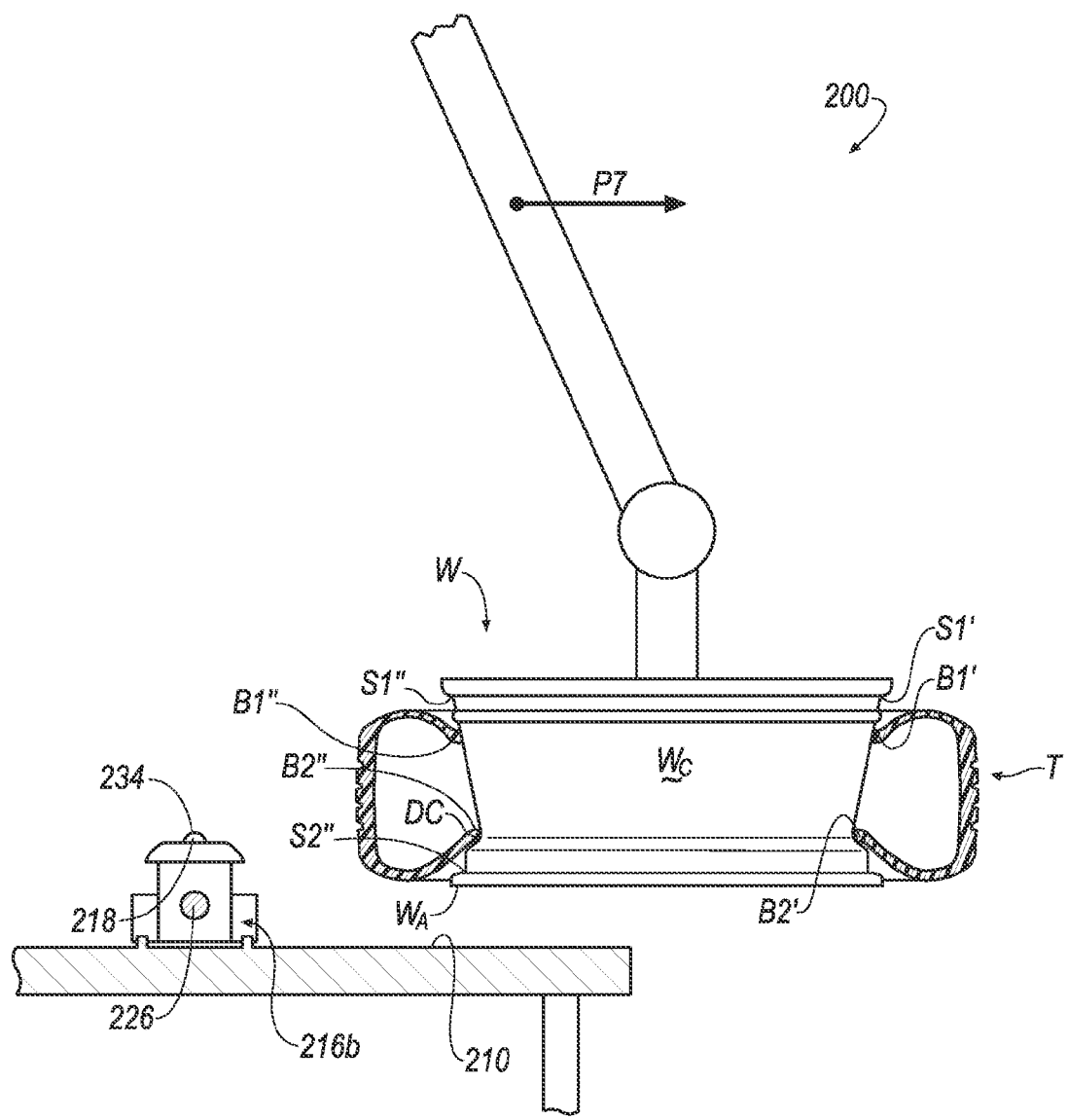

In an embodiment, referring to FIG. 11G, once the robotic arm 202 moves the wheel, W, and tire, T, according to the direction of the arrow, P7, the second bead, B2, of the tire, T, may be fully disposed proximate one or more of the drop center, DC, and second bead seat, S2, of the wheel, W. Further, as seen progressively from FIG. 11C through FIG. 11G, the first bead, B1, of the tire, T, may be further moved or seated at least proximate the first bead seat, S1, of the wheel, W, as the plurality of wheels or rollers 218 engages the first one-third (see, e.g., FIG. 11D), the first half (see, e.g., FIG. 11E) and last one-third (see, e.g., FIG. 11F) of the axial end/sidewall, $T_A$, of the tire, T. Once the tire, T, is mounted to the wheel, W, as seen, for example in FIG. 11G, the robotic arm 202 may advance the tire, T, and wheel, W, to a subsequent workstation for inflating the tire, T, or, alternatively, the end effector 204 may release the wheel, W, from the robotic arm 202, if desired.

Figure 12A:
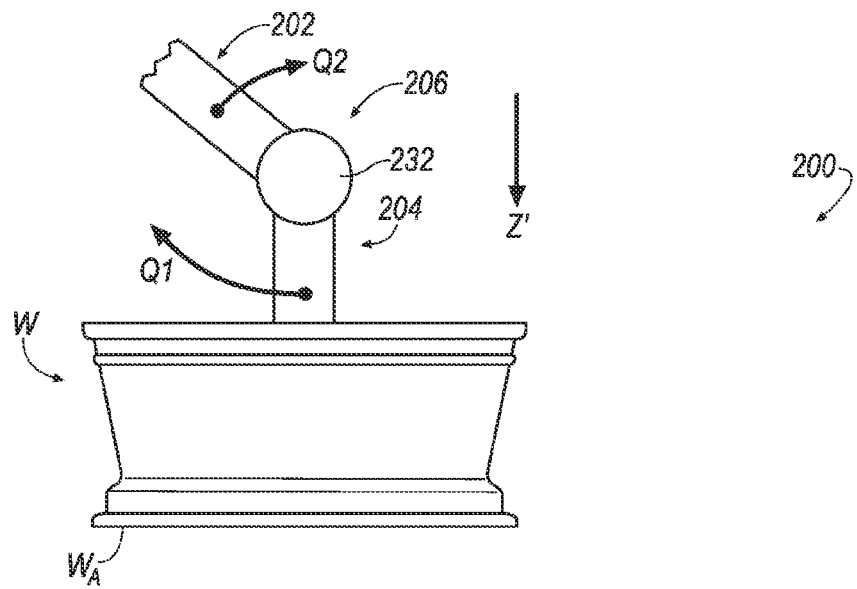
FIGS. 12A-12H illustrate a series of steps for utilizing the system of FIGS. 9-10 for mounting a vehicle tire and vehicle wheel in accordance with an exemplary embodiment of the invention.
Figure 12A:
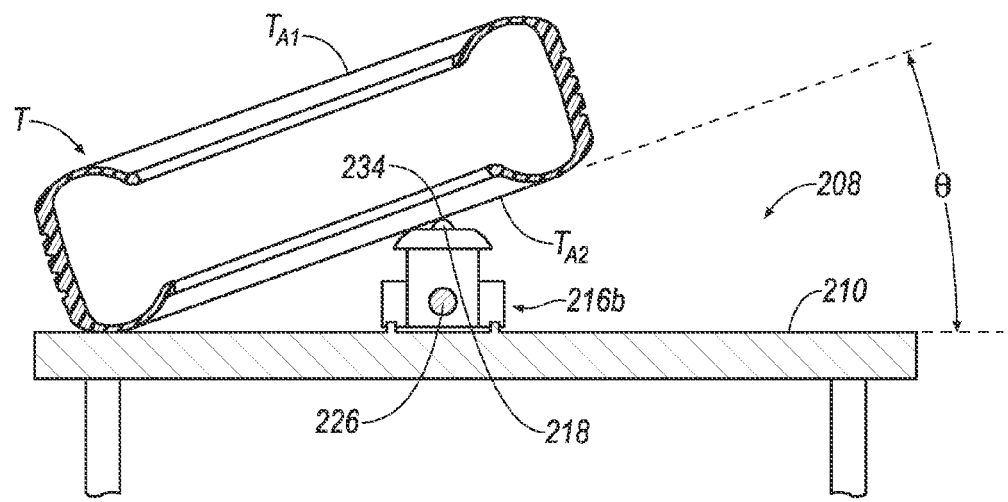

Referring now to FIG. 12A, another method for mounting a tire, T, and wheel, W, by utilizing the system 200 is described in accordance with an embodiment of the invention. Rather than pivoting one or more of the robotic arm 202 and end effector 204 relative the joint/pivot point 232 according to arrows, P1-P6, as described above, one or more of the robotic arm 202 and end effector 204 are pivoted relative the joint/pivot point 232 according to the direction of arrows, Q1, Q2. Further, as will be described in the foregoing disclosure, one or more of the robotic arm 202 and end effector 204 are moved in a "drop and sweep" motion according to the direction of the arrows, Z' and X.

Figure 12B:
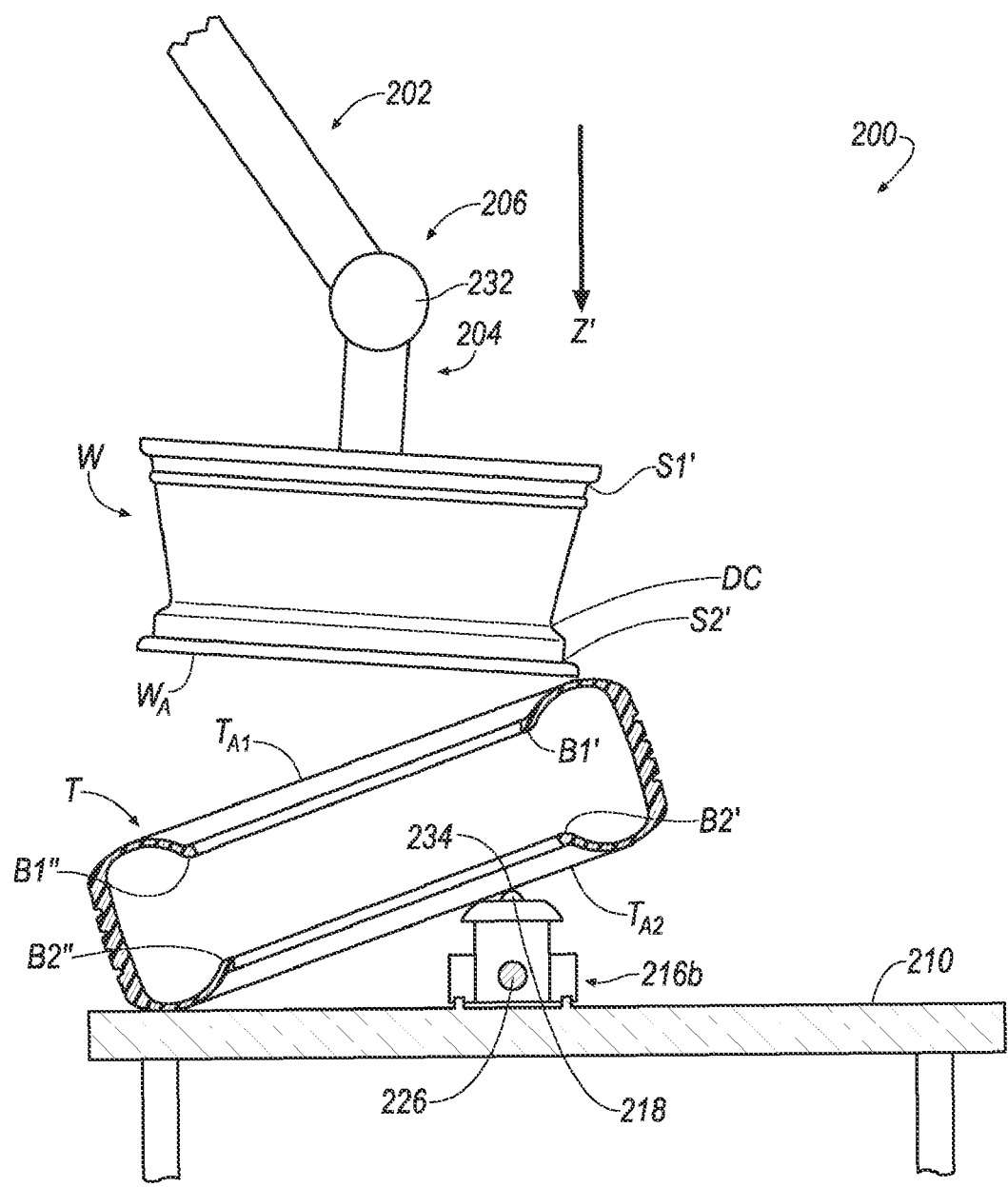
Figure 12C:
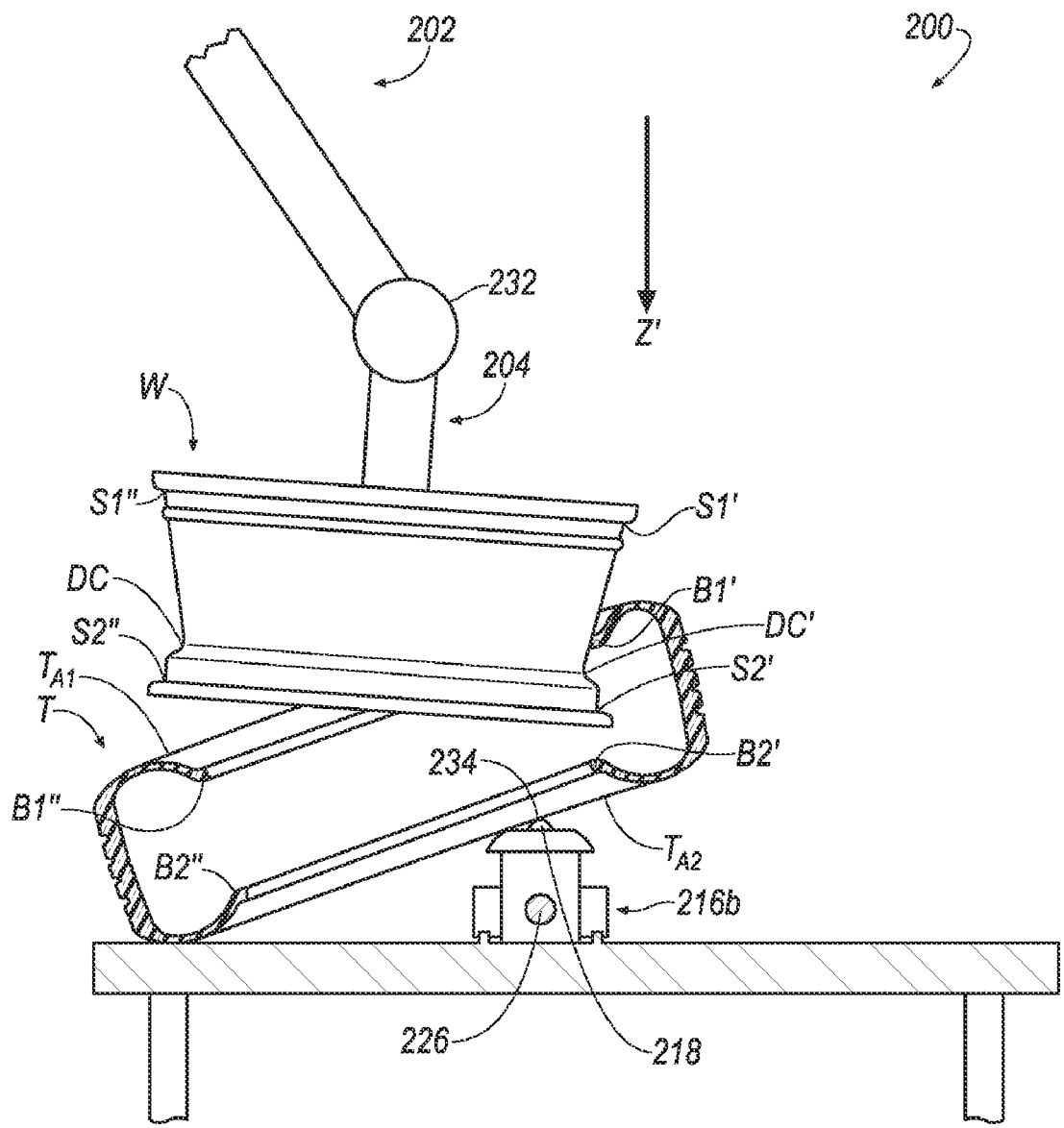

With initial reference to FIG. 12A, as the robotic arm 202 and end effector 204 are moved toward the tire-supporting portion 208 according to the direction of the arrow, Z', the end effector 204 may be pivoted clockwise relative the joint/pivot point 232 according to the direction of the arrow, Q1, as the robotic arm 202 is pivoted clockwise relative the joint/pivot point 232 according to the direction of the arrow, Q2, in order to position an axial end/sidewall, $W_A$, of the wheel, W, proximate a first/upper axial end/sidewall, $T_{A1}$, of the tire, T, as shown in FIG. 12B. In an embodiment, as seen in FIG. 12C, further movement according to the direction of the arrow, Z', results in a portion of the drop center portion, DC, of the wheel, W, being moved proximate a portion of the first bead, B1', of the tire, T, as a portion of the second bead seat, S2, of the wheel, W, is disposed between the first and second beads, B1', B2', of the tire, T.

Figure 12D:
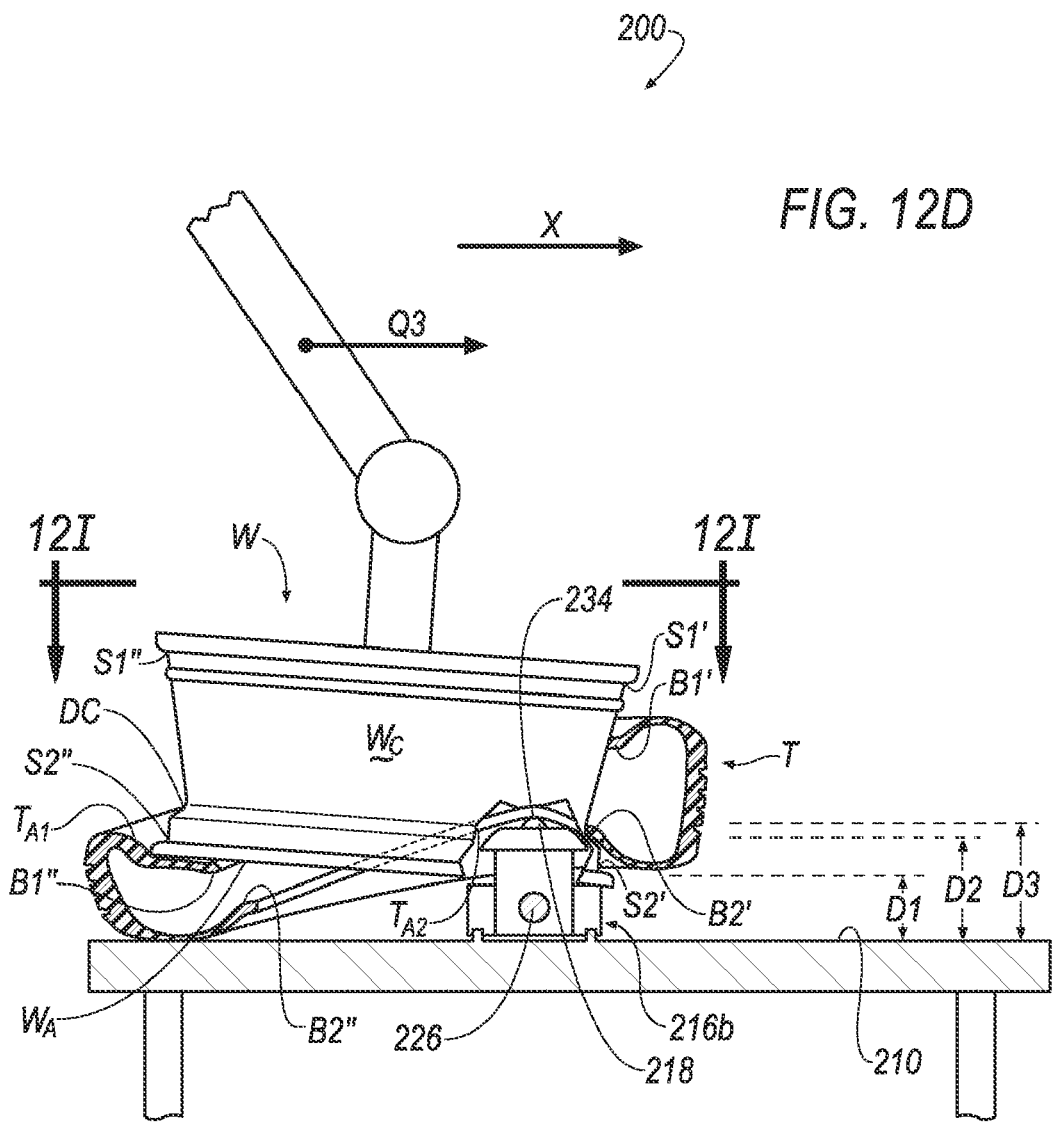
Figure 12I:
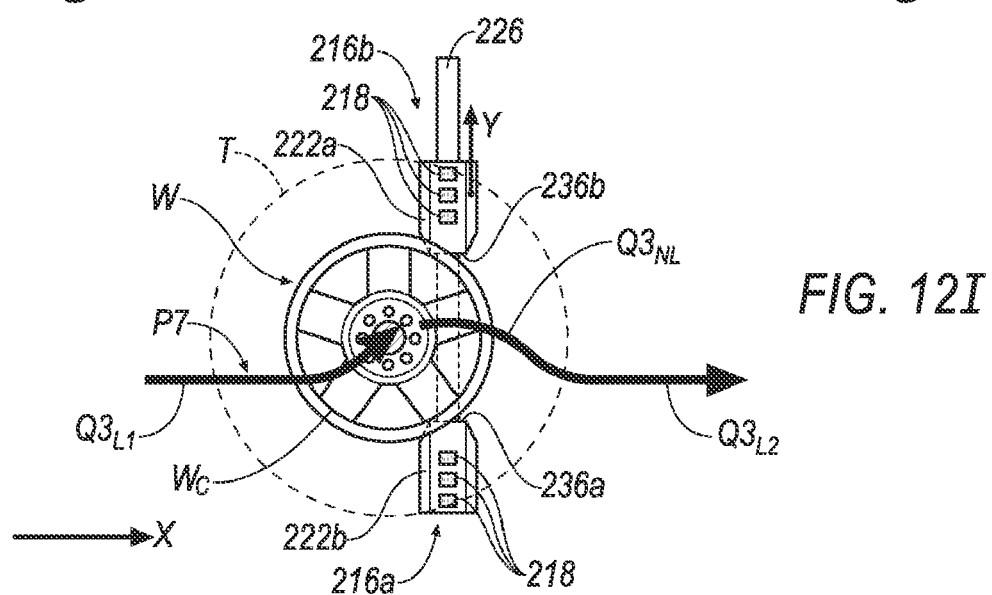
FIGS. 12I-12L illustrates a series of top view of the system according to lines 12I-12L of FIGS. 12D-12G in accordance with an exemplary embodiment of the invention.
Figure 12E:
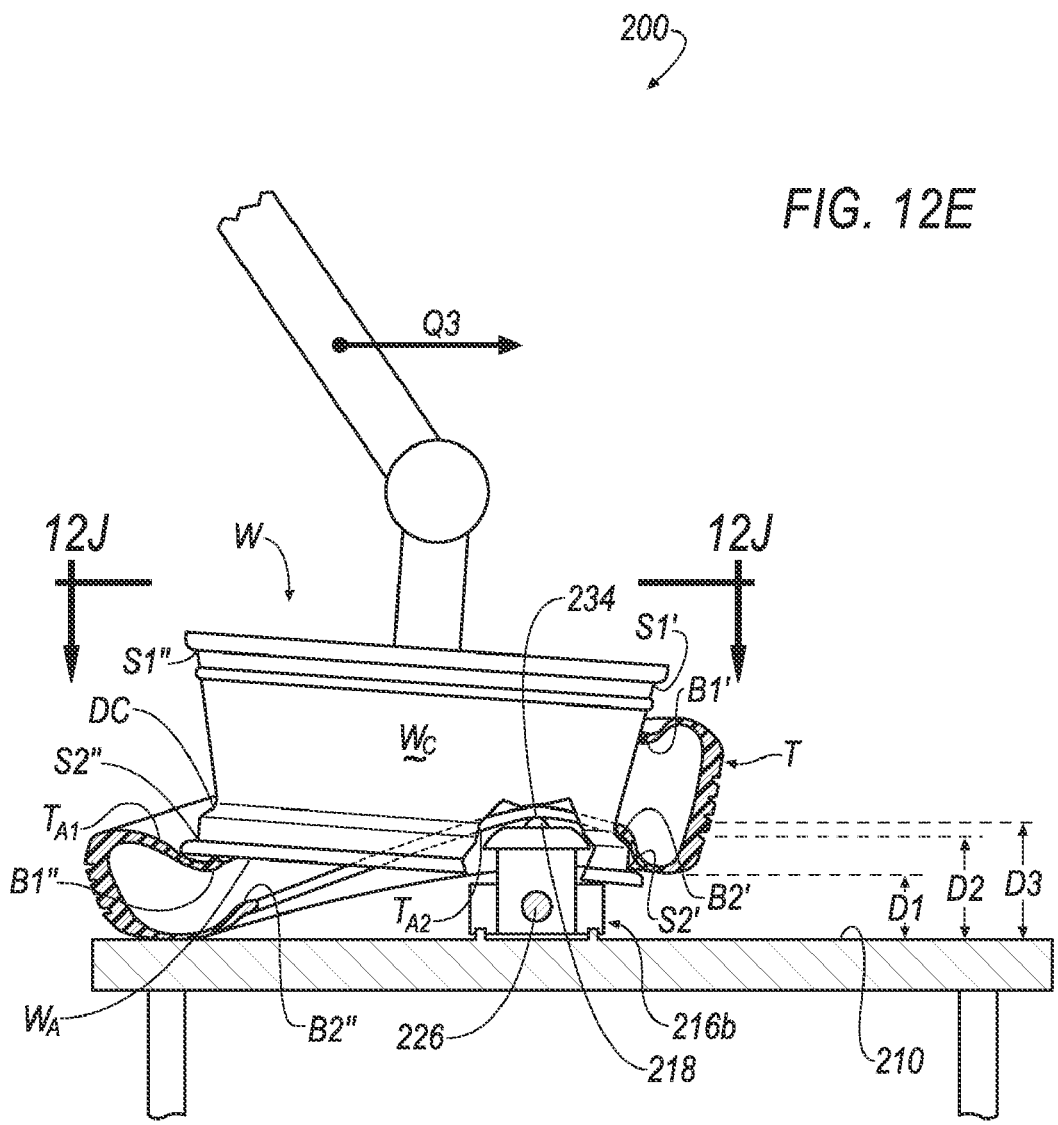
Figure 12J:
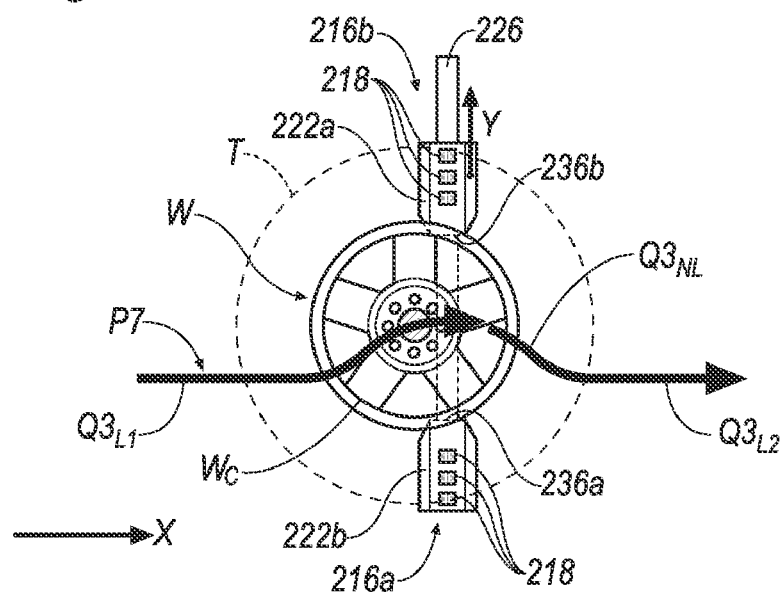
Figure 12F:
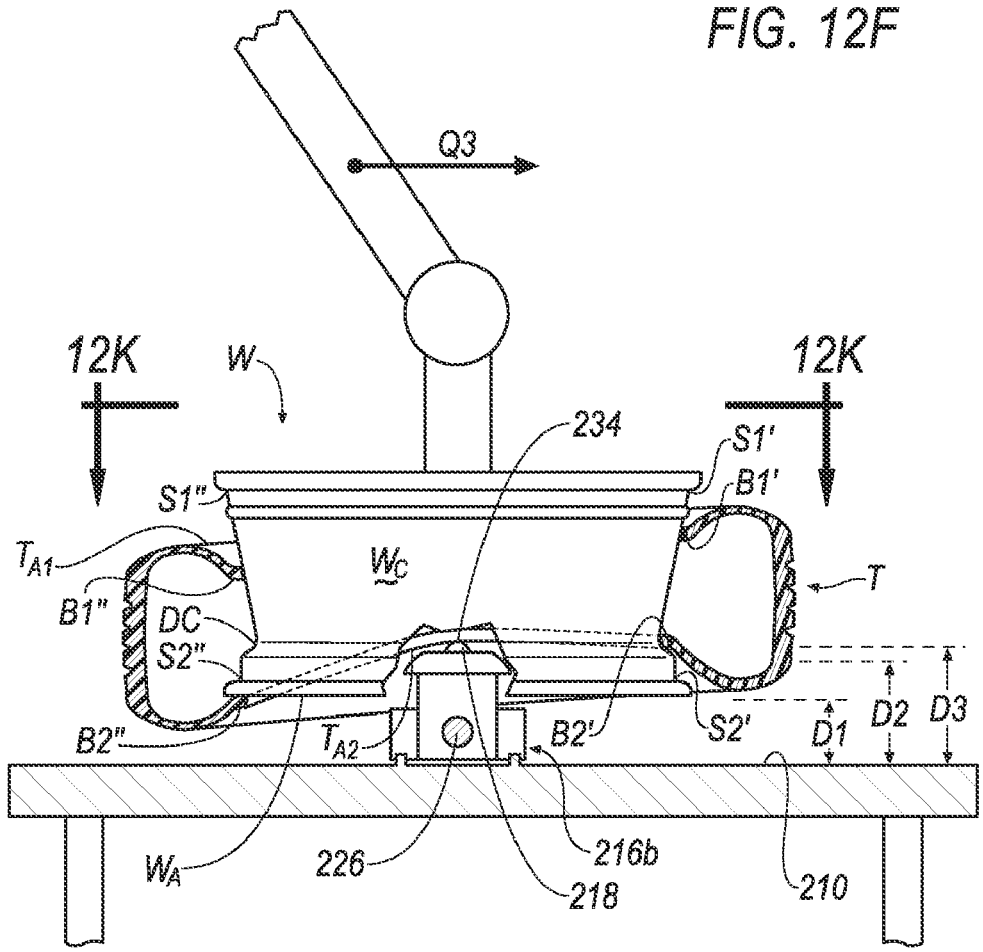
Figure 12K:
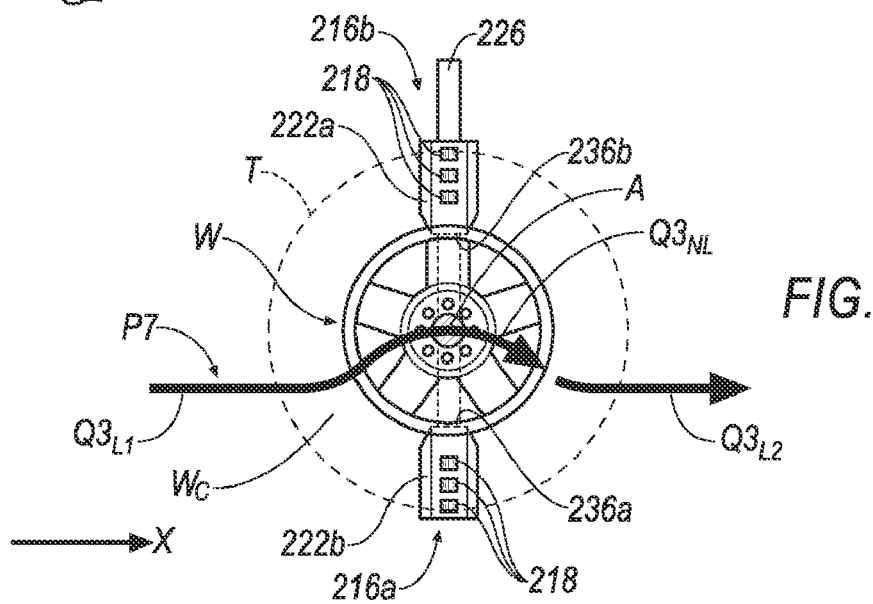
Figure 12G:
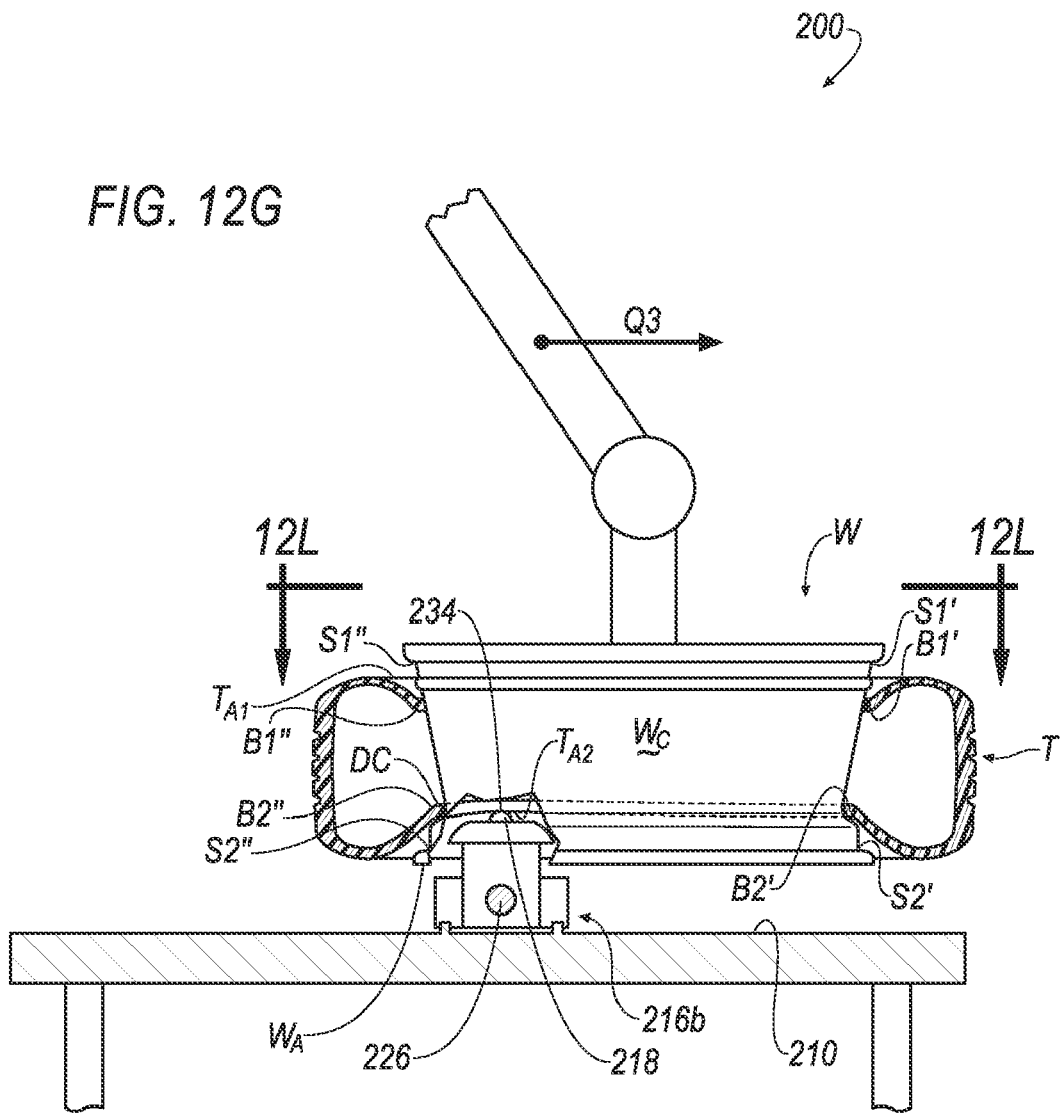
Figure 12L:
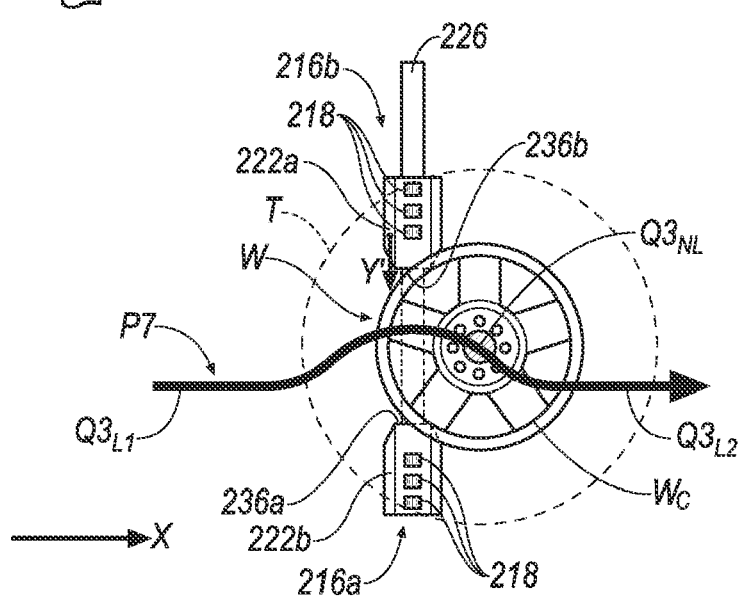

Referring to FIG. 12D, further movement of the robotic arm 202 and end effector 204 according to the direction of the arrow, Z', results in a portion of the second bead, B2', of the tire, T, being disposed substantially adjacent one or more of the drop center portion, DC, and second bead seat, B2'', of the wheel, W, as a portion of the axial end/sidewall, $W_A$, of the wheel, W, is disposed adjacent a portion of the first/upper axial end/sidewall, $T_{A1}$, of the tire, T, such that a portion of the wheel, W, substantially "crushes" a portion of the tire, T, thereby bringing a portion of the first bead, B1'', of the tire, T, and a portion of the second bead, B2'', of the tire, T, substantially adjacent or proximate one another. Further, as seen in FIG. 12D, the movement of the robotic arm 202 and end effector 204 according to the direction of the arrow, Z', results in the portion of the first bead, B1', of the tire, T, being located further away from the drop center portion, DC, of the wheel, W, and in closer proximity to that of the first bead seat, S1, of the wheel, W.

Movement of the robotic arm 202 and end effector 204 according to the direction of the arrow, Z', as described above in FIG. 12D concludes the "drop" motion of the "drop and sweep" movement described above. The "sweep" movement is then initiated as shown in FIG. 12D-12H by moving the robotic arm 202 according to the direction of the arrow, Q3.

As seen in FIGS. 12I-12L, the movement according to the direction of the arrow, Q3, is generally orientated in the same direction as that of the arrow, X, as similarly described above with respect to the direction of the arrow, P7. Further, in an embodiment, movement of the robotic arm 202 according to the direction of the arrow, Q3, may include one or more substantially linear segments, $Q3_{L1}$, $Q3_{L2}$, according to the direction of the arrow, X, and one or more substantially non-linear segments, $Q3_{NL}$, that includes a component of each of the arrows, X and Y (see, e.g., FIGS. 12I and 12J), or, alternatively, a component of each of the arrows, X and Y' (see, e.g., FIG. 12L).

Figure 12H:
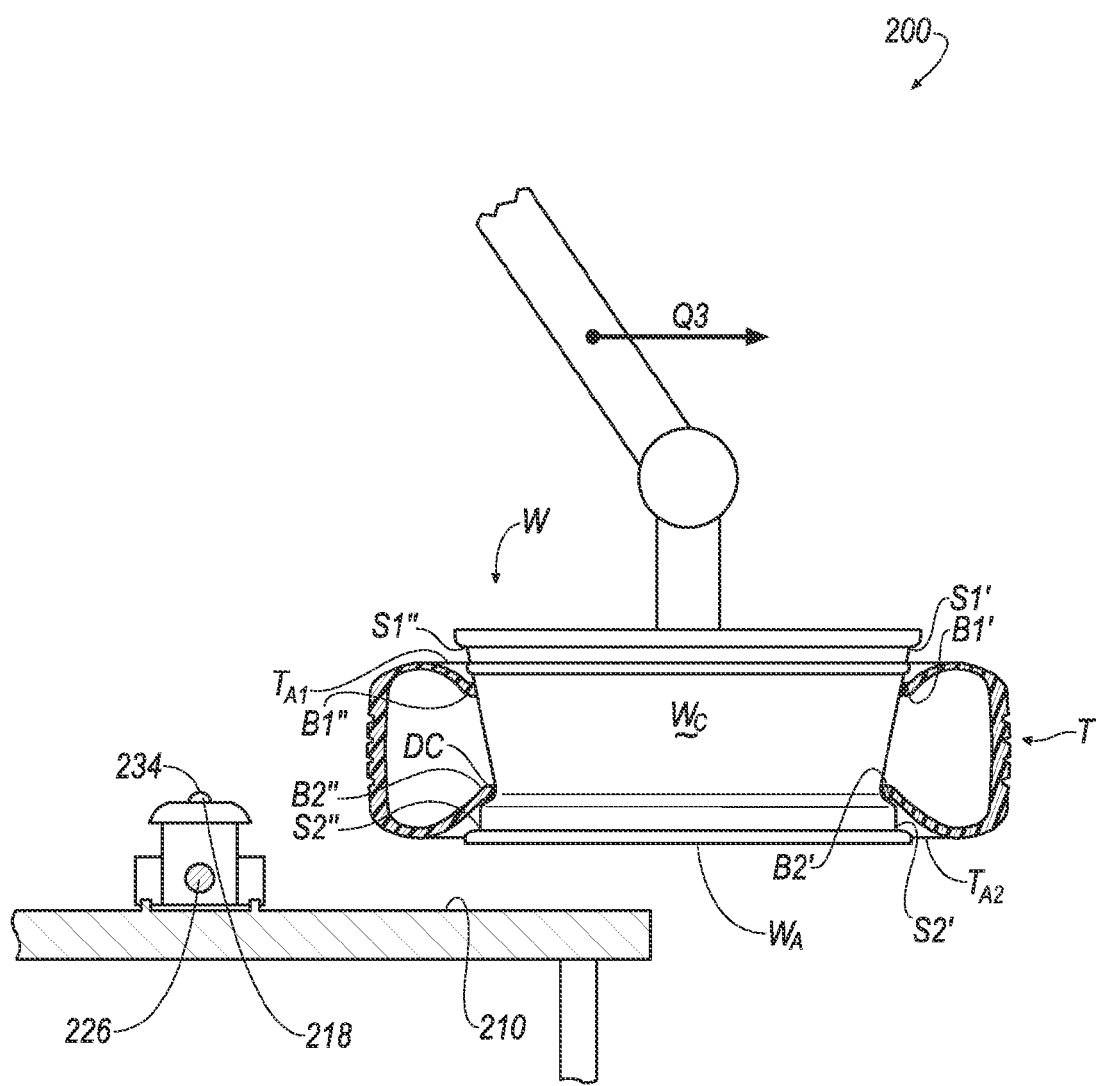

As illustrated in FIGS. 12D-12L, the fixed and displaceable portions 216a, 216b, operate on the tire, T, and wheel, W, as similarly described above in FIGS. 11A-11J such that the first and second beads, B1, B2, of the tire, T, are ultimately seated at least proximate the first and second bead seats, S1, S2, of the wheel, W (as shown, for example, in FIG. 12H). It will be appreciated that the general difference between the embodiment described at FIGS. 11A-11J and 12A-12L is that one or more of the robotic arm 202 and end effector 204 were pivoted in a plurality of directions according to arrows, P1-P6, in order to arrange at least a portion of the axial end/sidewall, $W_A$, of the wheel, W, between the first and second beads, B1, B2 (see, e.g., FIG. 11D) at the outset of the tire-manipulating process, whereas the robotic arm 202 and end effector 204 is substantially "dropped" without being interrupted with one or more pivoting movements typified by arrows, P1-P6, in order to dispose the axial end/sidewall, $W_A$, of the wheel, W, adjacent a portion of the first/upper axial end/sidewall, $T_{A1}$, of the tire, T, as shown in FIG. 12D at the outset of the tire-manipulating process.

In an embodiment, it will be appreciated that the methodology described at FIGS. 12A-12L may be preferable over the methodology described at FIGS. 11A-11J due to the fact that time may be saved during the mounting process due to the lacking of the plurality of movements according to the direction or arrows, P1-P6. Further, in an embodiment, it will be appreciated that the methodology described in FIGS. 12A-12L may be suitable for tires, T, having axial ends/sidewalls, $T_{A1}$, $T_{A2}$, that are relatively thin, flexible or the like, whereas the methodology shown and described in FIGS. 11A-11J may be suitable for tires, T, having relatively stiff axial ends/sidewalls, $T_{A1}$, $T_{A2}$, such as, for example, run-flat tires. However, it will be appreciated that either methodology is not limited to a particular type or style of tire, T, and that either methodology may be employed to mount any type or style of tire, T, to a wheel, W.

It is important to note that the invention set forth in FIGS. 9-12G eliminates the use of traditional installation tools (such as fitting tools, pressure roller wheels, tool packs or the like) used in the mounting of a tire to a wheel. It is accurate to characterize this aspect of the present invention as a "tool-less" mounting system. In an embodiment, the present invention could also be understood as a mounting system wherein at least one of the wheel and/or the tire are manipulated in a way such that they function as the mounting tools (or at least as one of the mounting tools). In an embodiment, one of the tire or the wheel is manipulated by a prime mover while the other remains passive (i.e. the passive component does not in the strict physics sense of the word, do any positive work to the component driven by the prime mover). This approach is vastly different from traditional methods all of which include the use of tools (such as tool packs and the like) which deform a tire in a way that it mounts the tire to the wheel while keeping the wheel fixed.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A system for mounting a tire to a wheel for forming a tire-wheel assembly, comprising:
   a tire-supporting portion including
      a support surface,
      a pair of wheel-engaging and tire-manipulating portions disposed upon the support surface, wherein the pair of wheel-engaging and tire-manipulating portions includes
         a first wheel-engaging and tire-manipulating portion arranged upon the support surface, and
         a second wheel-engaging and tire-manipulating portion arranged upon the support surface.

2. The system according to claim 1, further comprising:
   a first substantially vertical flange connected to first wheel-engaging and tire-manipulating portion, wherein the first substantially vertical flange extends from the support surface, and a second substantially vertical flange connected to the second wheel-engaging and tire-manipulating portion, wherein the second substantially vertical flange is movably-supported by the support surface.

3. The system according to claim 2, further comprising:
a substantially horizontal flange connecting the first and second substantially vertical flanges, wherein the second wheel-engaging and tire-manipulating portion is slidably-disposed upon the substantially horizontal flange, wherein the substantially horizontal flange extends through an opening formed in the second substantially vertical flange.

4. The system according to claim 2, further comprising:
a pair of rails extending from the support surface, wherein the second substantially vertical flange defines
a pair of recesses that receives the pair of rails, wherein the second substantially vertical flange is slidably-disposed upon the pair of rails.

5. The system according to claim 1, wherein each of the first and second wheel-engaging and tire-manipulating portions includes:
a housing having an edge surface and an upper surface defining a plurality of openings, and
a plurality of wheels or rollers that extend from the housing and through the plurality of openings.

6. The system according to claim 5, wherein the plurality of wheels or rollers defines:
means for engaging and manipulating an axial end surface sidewall of the tire for seating at least one or more of a first and second bead of a tire at least proximate one or more of a first and second bead seat of a wheel.

7. The system according to claim 5, wherein the edge surface of the housing defines:
means for engaging a portion of a circumference of the wheel.

8. The system according to claim 1, wherein the first wheel-engaging and tire-manipulating portion is fixedly-disposed relative the support surface.

9. The system according to claim 1, wherein the second wheel-engaging and tire-manipulating portion is movably-disposed relative the support surface.

10. The system according to claim 1, further comprising:
a robotic arm pivotably-connected to an end effector that retains and releasably-fixes the wheel proximate an end of the robotic arm, wherein the robotic arm is spatially movable relative the tire supporting portion in a plurality of directions.

11. A method for mounting a tire to a wheel for forming a tire-wheel assembly, comprising the steps of:
utilizing a pair of wheel-engaging and tire-manipulating portions disposed upon a support surface of a tire-supporting portion for
engaging a portion of a circumference of the wheel, and engaging and manipulating an axial end surface/sidewall of the tire; and
utilizing a device that is spatially movable relative the tire supporting for
moving the wheel and tire relative the pair of wheel-engaging and tire-manipulating portions wherein the wheel drags the tire against the wheel-engaging member thereby mounting the tire to the wheel.

12. The method according, to claim 11, wherein the releasably-fixing the wheel to the device includes the steps of:

releasably-fixing the wheel to an end effector that is pivotably-connected to an end of the device at a joint/pivot point; and
pivoting one or more of the device and end effector relative the pivot point.

13. The method according to claim 11, wherein the utilizing the device to locate the wheel at least proximate the tire step includes the steps of:
locating a first portion of a first, upper bead of the tire at least proximate a first, upper bead seat of the wheel,
locating a second portion of the first, upper bead of the tire at least proximate a drop center portion of the wheel,
locating a first portion of a second, lower bead of the tire at least proximate the drop center portion of the wheel, and
locating a second portion of the second, lower bead of the tire at least proximate an axial end/sidewall of the wheel.

14. The method according to claim 11, wherein the utilizing the device to locate the wheel at least proximate the tire step includes the steps of:
locating a first portion of a first, upper bead of the tire proximate a first, upper bead seat of the wheel;
locating a portion of the axial end/sidewall of the wheel adjacent one or more of a second portion of the first upper bead of the tire and a portion of a first/upper axial end sidewall of the tire; and
locating a first portion of a second, lower bead of the tire at least proximate one or more of a drop center portion and a second, lower bead seat of the wheel.

15. The method according to claim 14, wherein the locating a portion of the axial end/sidewall of the wheel step includes the step of:
substantially crushing a portion of the tire thereby brining opposing portions of the first and second beads of the tire substantially adjacent or proximate one another.

16. The method according to claim 11, wherein the moving the wheel and tire relative the pair of wheel-engaging and tire-manipulating portions step includes the step of:
utilizing the device to move the wheel along
one or more substantially linear paths, and
a non-linear path.

17. The method according to claim 16, wherein, responsive to moving the wheel along the non-linear path, further comprising the step of:
engaging opposing portions of the circumference of the wheel adjacent an edge of each of the a first and second wheel-engaging and tire-manipulating portion of the pair of wheel-engaging and tire-manipulating portions; and
moving the second wheel-engaging and tire-manipulating portion of the pair of wheel-engaging and tire-manipulating portions away from or toward the first wheel-engaging and tire-manipulating portion of the pair of wheel-engaging and tire-manipulating portions.

18. The method according to claim 11, wherein the device is a robotic arm.

19. The method according to claim 18, wherein, prior to the utilizing the pair of wheel-engaging and tire-manipulating portions disposed upon the support surface of the tire-supporting portion step, further comprising the steps of:
releasably-fixing the wheel to the robotic arm;
disposing the tire upon a tire-supporting portion including a support surface; and
utilizing the robotic arm to locate the wheel at least proximate the tire.

* * * * *